United States Patent [19]
Satoh et al.

[11] Patent Number: 5,600,634
[45] Date of Patent: Feb. 4, 1997

[54] MULTIPLEX SERIAL DATA COMMUNICATION CIRCUIT NETWORK WITH SUPERPOSED CLOCK AND DATA SIGNALS

[75] Inventors: Yoshinori Satoh, Yokosuka; Takashi Matsumoto, Yokohama, both of Japan

[73] Assignee: Nissan Motor Co., Ltd., Yokohama, Japan

[21] Appl. No.: 405,053

[22] Filed: Mar. 15, 1995

[30] Foreign Application Priority Data

| Mar. 17, 1994 | [JP] | Japan | 6-046686 |
| Sep. 30, 1994 | [JP] | Japan | 6-237953 |
| Dec. 27, 1994 | [JP] | Japan | 6-338244 |

[51] Int. Cl.$^6$ ................................ H04B 1/56
[52] U.S. Cl. .............. 370/294; 375/359; 370/520; 370/527
[58] Field of Search ................ 370/44, 77, 78, 370/85.1, 100.1, 105.5, 109, 110.4, 119, 29, 103; 375/282, 333, 359, 360, 361, 377; 340/825.57, 825.62; 341/68, 69, 70, 71, 173

[56] References Cited

U.S. PATENT DOCUMENTS

| 3,967,058 | 6/1976 | Moriya et al. | 370/29 |
| 4,575,860 | 3/1986 | Scordo | 375/359 |
| 4,809,304 | 2/1989 | Chau | 375/359 |
| 4,972,408 | 11/1990 | Le Bihan Hervé et al. | 370/84 |
| 5,086,427 | 2/1992 | Whittaker et al. | 370/85.1 |
| 5,121,386 | 6/1992 | Wolfsgruber et al. | 370/85.1 |
| 5,268,937 | 12/1993 | Marbot | 375/377 |
| 5,315,299 | 5/1994 | Matsumoto | 341/53 |
| 5,329,525 | 7/1994 | Sakagami | 370/85.1 |
| 5,390,185 | 2/1995 | Hooijmans et al. | 370/110.4 |

FOREIGN PATENT DOCUMENTS

| 3614638A1 | 4/1986 | Germany . |
| 3932316A1 | 9/1989 | Germany . |
| 4405482A1 | 2/1994 | Germany . |
| 5-122203 | 5/1993 | Japan . |
| 2011229 | 7/1979 | United Kingdom . |
| 2258544 | 2/1993 | United Kingdom . |
| 2259632 | 3/1993 | United Kingdom . |
| 2260883 | 4/1993 | United Kingdom . |

OTHER PUBLICATIONS

Japanese Service Manual—Nissan President (JHG50-1)—Published Oct., 1990, p. E–87.

*Primary Examiner*—Benedict V. Safourek
*Assistant Examiner*—Ricky Q. Ngo
*Attorney, Agent, or Firm*—Lowe, Price, LeBlanc & Becker

[57] ABSTRACT

In multiplex serial data communication circuit network and method, a clock information is always output from a single transmission control apparatus having an oscillation source onto a single signal transmission line. Any one of the other transmission control apparatuses carries out a serial data transmission with the clock pulse signal superposed on the data to be transmitted via the single transmission line. In addition, any one of the transmission control apparatuses extracts the clock information from the clock information superposed data signals on the single transmission line and takes an operation timing within all transmission control apparatuses from the extracted clock pulse signal. Furthermore, a remote DC motor control system and method using the multiplex serial data communication circuit network described above are exemplified. Master station and slave stations in the DC motor control system can be integrated into each plurality of ICs.

29 Claims, 23 Drawing Sheets

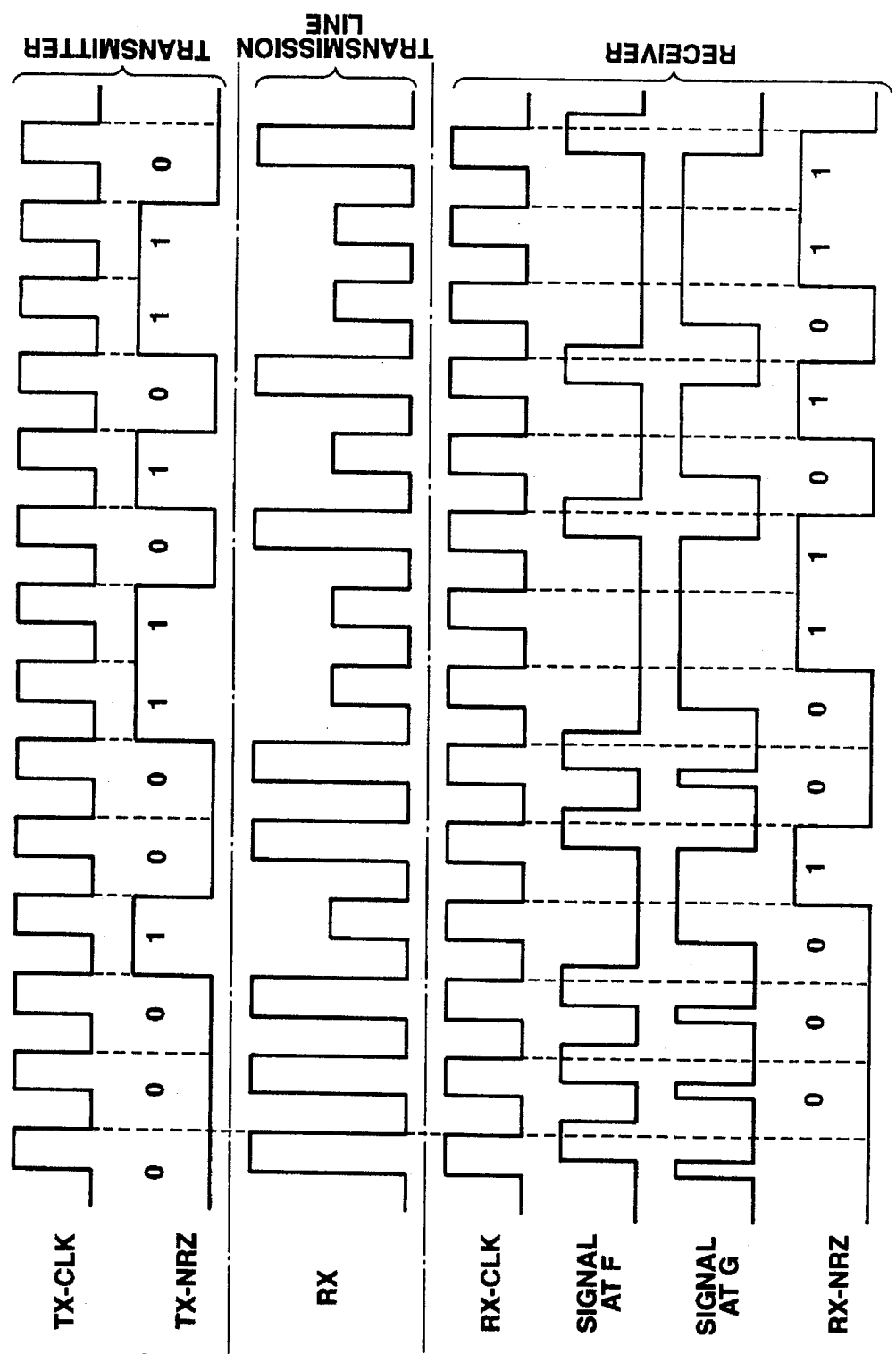

「00」

「01」

「10」

「11」

TRANSMISSION START CODE
FIG.24 (ON TIME DURATION DEFINING PULSE) (ONE PULSE)
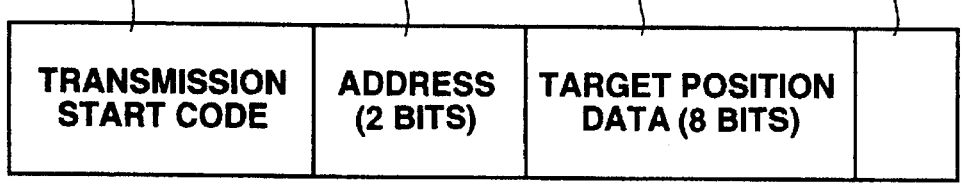
| 30100 | 30200 | 30300 | 30400 |
|---|---|---|---|
| TRANSMISSION START CODE | ADDRESS (2 BITS) | TARGET POSITION DATA (8 BITS) | |

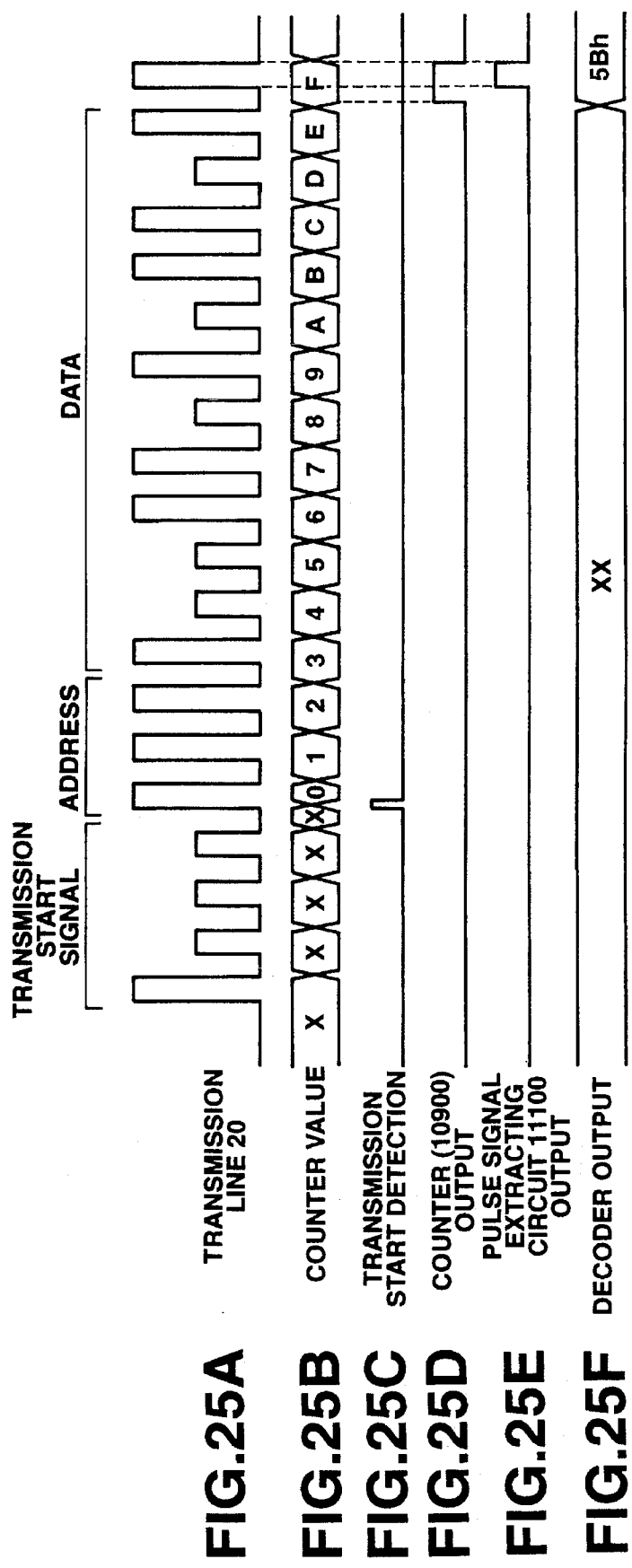

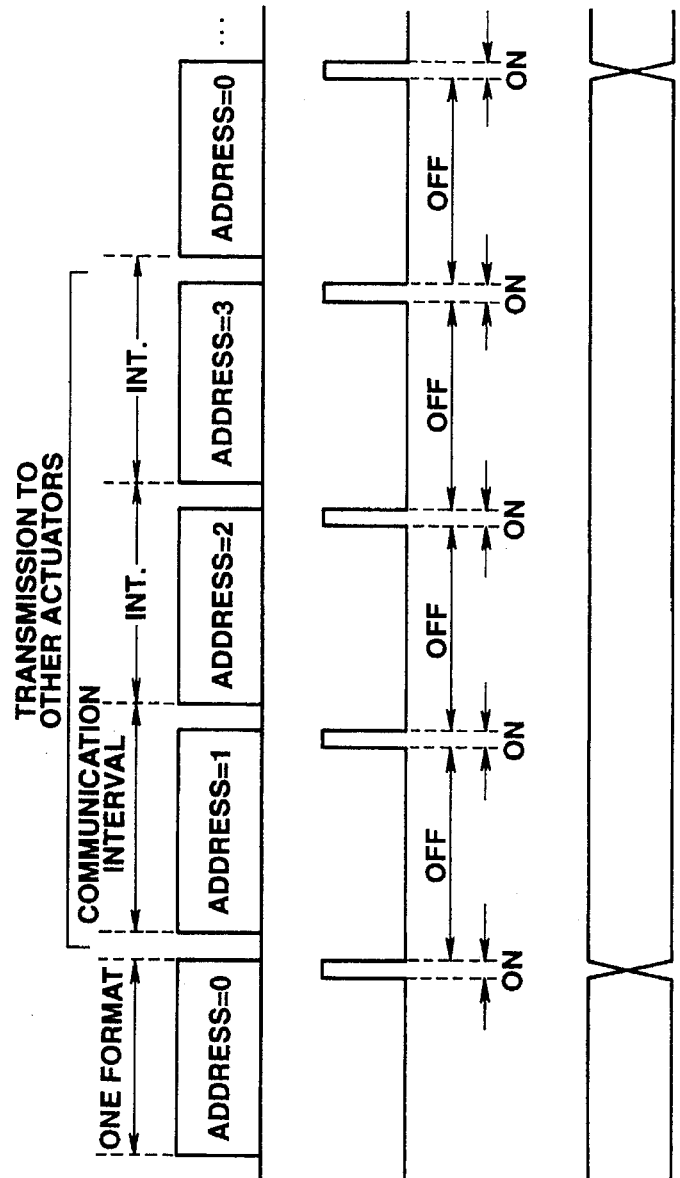
FIG. 26A TRANSMISSION LINE
FIG. 26B PULSE SIGNAL EXTRACTING CIRCUIT OUTPUT
FIG. 26C DECODER OUTPUT 5,600,634

MULTIPLEX SERIAL DATA COMMUNICATION CIRCUIT NETWORK WITH SUPERPOSED CLOCK AND DATA SIGNALS

BACKGROUND OF THE INVENTION

1. Field of the Invention

The present invention relates to a multiplex serial data communication circuit network and method and motor control system and method using the multiplex serial data communication circuit network and method applicable to an automotive vehicle in which a data signal and a clock pulse signal are superposed on each other using a single signal transmission line.

2. Description of the Background Art

It is necessary to provide two circuit lines of a data transmission line and a clock (pulse) transmission line in a case where a synchronous serial transmission is carried out in which a bit synchronization is adopted in accordance with a clock pulse signal. However, since the number of the circuit lines give a large influence on a cost of installing a long distance range of data transmission circuit network or installing an inter multi-station data transmission network, it is desirable to transmit the data signal and clock pulse signal with a single transmission line and it is necessary to adopt such a self-synchronization technique as to extract the clock pulse signal from the data signal and encode or decode the data signal using the extracted clock signal.

One of various techniques of self-synchronization includes a utilization of a Manchester code as shown in FIG. 2.

Although a NRZ (Non-Return to Zero) code shown in FIG. 1 is a simplest and most basic digital code, no level change in a signal when a data of "0" is continued or a data of "1" is continued so that a sufficient clock information is not included in the NRZ code.

On the other hand, the Manchester code is such a code that a rising edge occurs at a center of a bit when the data is "0" and a falling edge occurs at the center of the bit when the data is 1 (refer to FIG. 2).

Consequently, since either of rising or falling edge always occurs at the center of the bit, the clock information is included for every bit.

FIG. 3 shows an example of a clock pulse signal extracting circuit to extract the clock pulse signal from the Manchester code.

FIGS. 4A through 4E show integrally a timing chart of each part denoted by A, B, C, D, and E of FIG. 3.

A data signal A constituted by the Manchester code received from the transmission line is directly input to one of input ends of an Exclusive-OR circuit 1, the other input end thereof receiving a delayed signal (delay signal B) of the data signal A via a delay circuit 2. An output signal from the Exclusive-OR circuit 2 is input to one of two input ends of a AND circuit 3. The other input end of the AND circuit 3 receives a negated (NOTed) output signal D of a monostable multivibrator 4.

An output signal E of the AND circuit 3 is extracted as the clock signal component. Then, a negatived (NOTed) input signal of the output signal E is fed back and received by the mono-stable multivibrator 4.

Each signal of A through E corresponds to A through E of FIGS. 4A through 4E.

In operation, when the data signal A of the Manchester code corresponding to the data value shown in FIG. 2 is received by the Exclusive-OR circuit 1, the Exclusive-OR circuit 1 outputs the output signal C having a high level (H) only when either of the data signal A or the delay signal B of the delay circuit 2 is at the high level (H). On the other hand, the mono-stable multivibrator 4 receives the high level signal (H) upon the rising edge of the output signal E of the AND circuit 3 and outputs the output signal having the high level (H) for a constant period of time upon a triggering it by the input high level signal (H). Hence, the other input end of the AND circuit 3 is at the high level (H) while the next triggering occurs after the end of the high level output signal from the mono-stable multivibrator 4 since the output signal of the mono-stable multivibrator 4 is negated (NOTed) and input to the other input end of the AND circuit 3. During the high level state of the other input end of the AND circuit 3, the output signal of the AND circuit 3 is at the high level (H) if the output signal C of the Exclusive-OR circuit 1 is at the high level (H).

Consequently, the clock pulse signal component E shown in FIG. 4E is extracted. Then, the thus achieved clock pulse signal component is further processed and is used to decode the received data.

Although, in the above-described self-synchronization technique, the clock pulse signal component can be extracted for each bit, a generation timing of the clock pulse signal component is different according to the received data signal. Hence, it is not possible for the extracted clock signal component to be used as a timing signal for decoding the data signal.

Consequently, it is necessary to newly provide a time reference generator such as an oscillator in order to generate a timing to determine "0" or "1" of each bit.

In addition, since the extraction of the clock pulse signal is carried out only during the data reception and cannot be used for other operations than the data reception, it is necessary to install an oscillation source to generate the clock information in order to transmit the data. The other processing operations are based on signals derived from the oscillation source.

As described above, in a serial data transmission circuit network in which the above-described self-synchronization technique is adopted, it is necessary to install oscillation sources in respective stations (data generating and receiving stations) constituting the network. Consequently, this introduces an increase in cost of installing the serial data transmission circuit network in a data transmission area such as an automotive vehicle.

SUMMARY OF THE INVENTION

It is a principal object to provide a multiplex serial data communication circuit network and method and motor control system and method using the multiplex serial data communication circuit network and method which enable the serial data communication only by installing an oscillation source to generate a clock information in a single data transmission control apparatus from among a plurality of data transmission stations (data transmission control apparatuses) mutually connected via a single signal transmission line.

The above-described object can be achieved by providing a multiplex serial data communication circuit network comprising: a) a clock pulse oscillation circuit; b) a single signal transmission line; c) a clock pulse signal output circuit which is so constructed and arranged as to transmit a clock pulse signal generated by the clock pulse oscillation circuit on said single signal transmission line; d) a transmission data generation/output circuit which is so constructed and arranged as to superpose a transmission data on the clock pulse signal output from said clock pulse signal output circuit; e) a clock pulse signal extraction circuit which is so constructed and arranged as to receive signals present on the transmission line and as to extract the clock pulse signal from the received signals; and f) means for separating and extracting a signal required to operate therein from among the received signals and for executing a signal processing in synchronization with the extracted clock pulse signal.

The above-described object can also be achieved by providing a multiplex serial data communication method comprising the steps of: a) providing a clock pulse oscillation circuit; b) providing a single signal transmission line; c) transmitting a clock pulse signal generated by the clock pulse oscillation circuit on said single signal transmission line; d) superposing a transmission data on the clock pulse signal output from said clock pulse signal output circuit; e) receiving signals present on the transmission line and as to extract the clock pulse signal from the received signals; and f) separating and extracting a signal required to operate therein from among the received signals and for executing a signal, processing in synchronization with the extracted clock pulse signal.

BRIEF DESCRIPTION OF THE DRAWINGS

FIGS. 11A, 11B, and 11C are integrally a signal timing chart for explaining an operation of the multiplex serial data communication network in the second embodiment shown in FIG. 6.

FIG. 24 is an explanatory view of a data format adopted in the third example of the motor control system shown in FIG. 21.

FIGS. 25A, 25B, 25C, 25D, 25E, 25F are integrally a signal timing chart for explaining an operation in the third example of the motor control system shown in FIG. 21.

FIGS. 26A, 26B, and 26C are integrally a signal timing chart for explaining an operation in a fourth example comparative to the third example of the motor control system shown in FIG. 21.

BEST MODE FOR CARRYING OUT THE INVENTION

Reference will hereinafter be made to the drawings in order to facilitate a better understanding of the present invention.

It is noted that FIGS. 1, 2, 3, and 4A through 4E have already been explained in the BACKGROUND OF THE INVENTION.

(First Embodiment)

Figure 5:
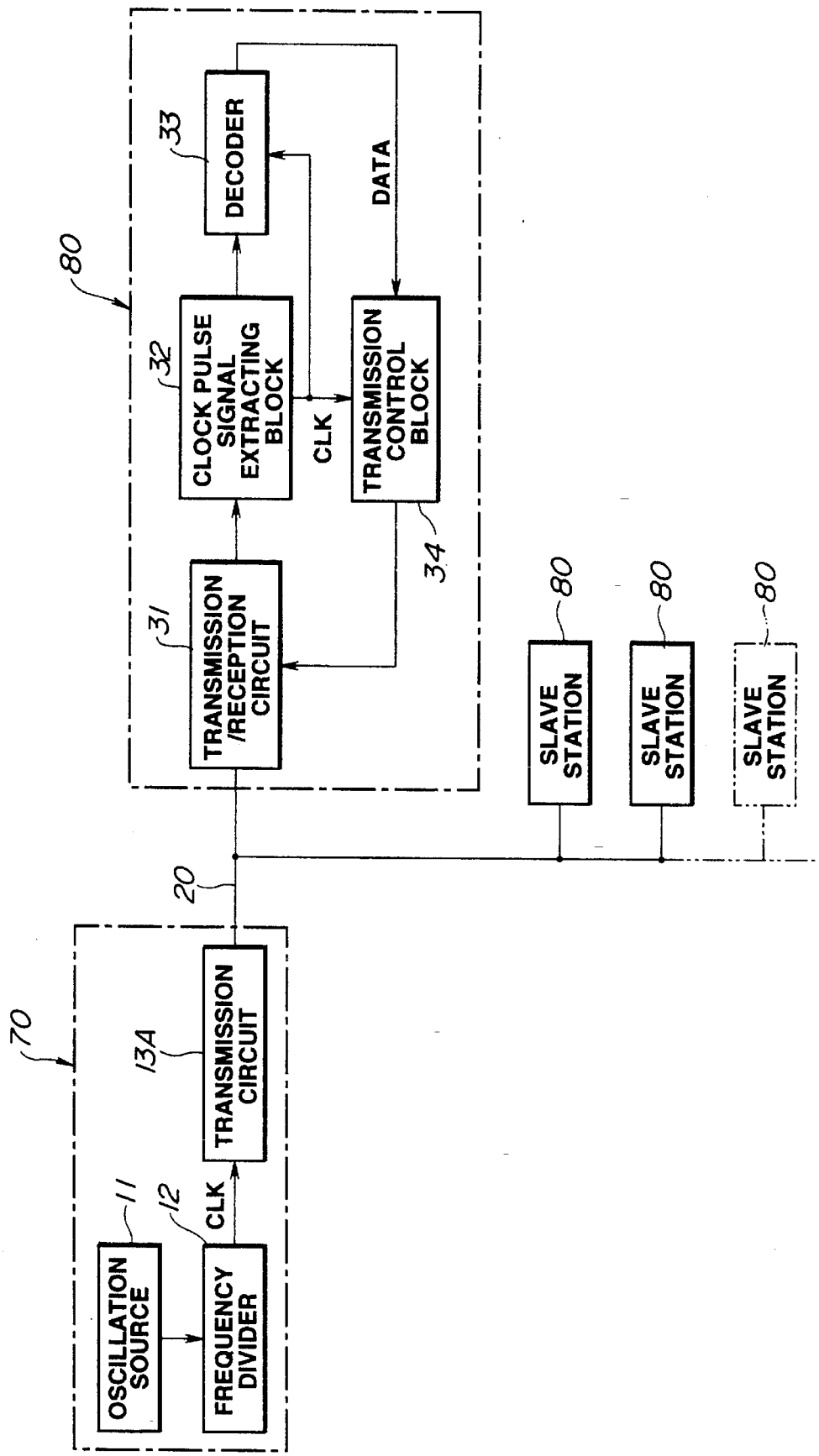
FIG. 5 is a circuit block diagram of a first preferred embodiment of a multiplex serial data communication circuit network according to the present invention.

FIG. 5 shows a first preferred embodiment of a multiplex serial data communication circuit network according to the present invention.

In the first embodiment shown in FIG. 5, an oscillation source 11, a frequency divider 12, and a transmission circuit 13A constitute a single self-contained station (a single transmission control apparatus) 70. The self-contained station 70 is connected to a signal transmission line 20. The signal transmission line is connected to each of a plurality of data stations 80 (slave stations, or called a plurality of transmission control apparatuses).

Each slave station 80 includes a transmission/reception circuit 31, a clock pulse signal extracting circuit 32, a decoder 33, and a transmission control block 34.

Specific structures of the oscillation source 11, the frequency divider 12, the transmission circuit 13A, the transmission/reception circuit 31, the clock pulse signal extracting circuit 32, the decoder 33, and the transmission control block 34 will be explained later in a second preferred embodiment.

Figure 6:
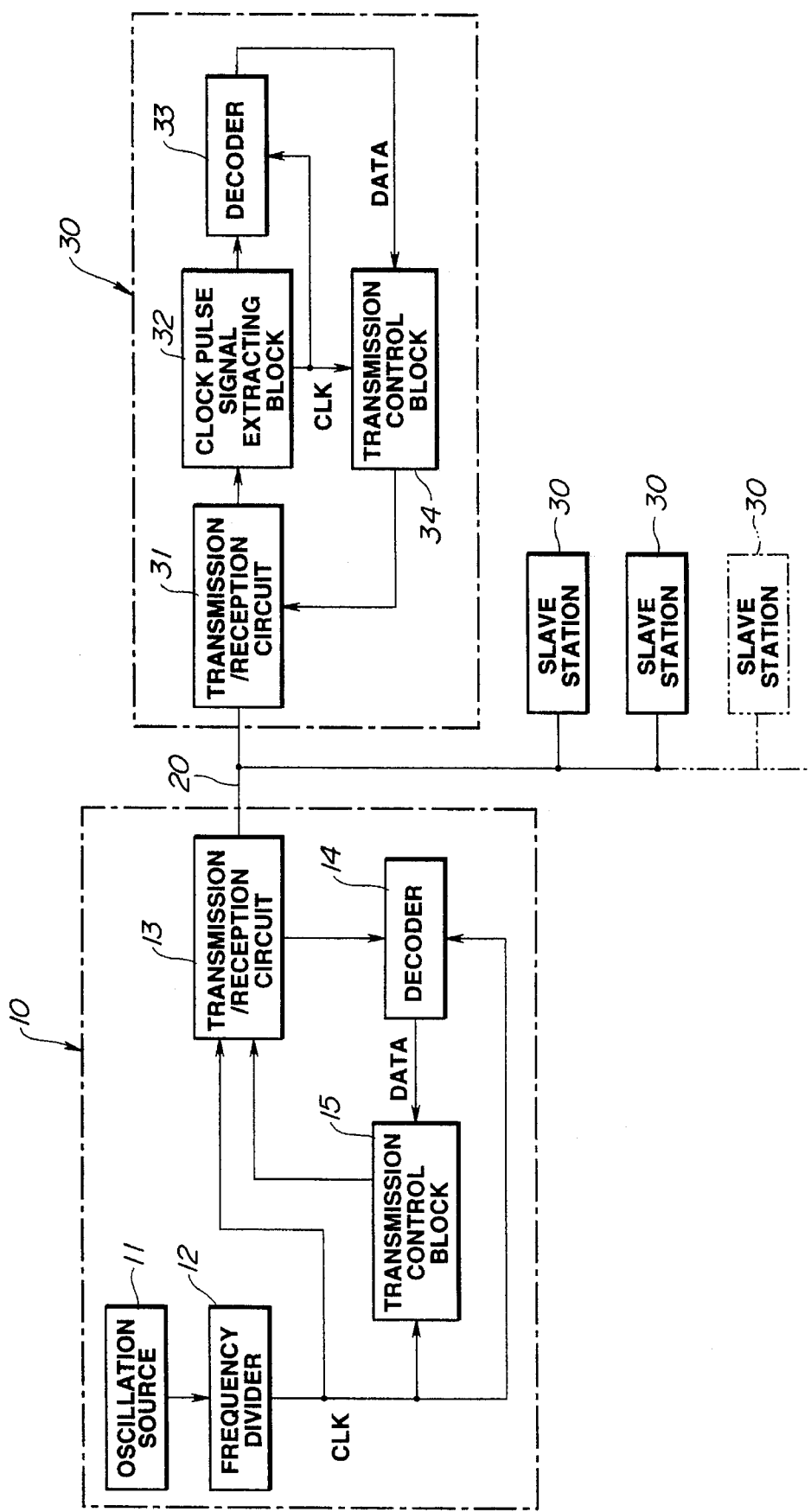
FIG. 6 is a circuit block diagram of a second preferred embodiment of the multiplex serial data communication circuit network according to the present invention.
Figure 7:
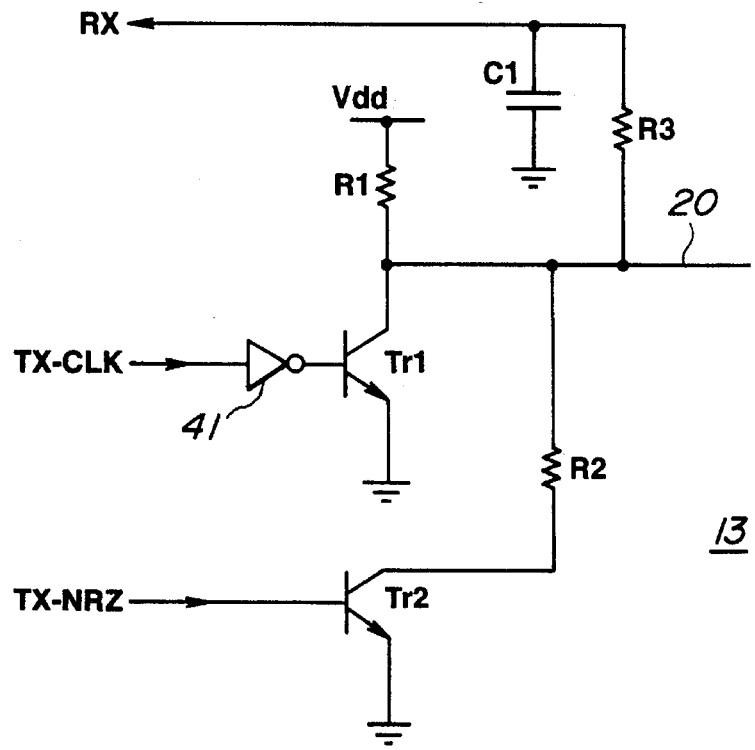
FIG. 7 is a schematic wiring diagram of a transmission/reception circuit 13 shown in FIG. 6.

It is, however, noted that the structures of the oscillation source 11 and the frequency divider 12 are the same as those shown in FIG. 6 and the transmission circuit 13A functions to transmit the clock pulse signal on the signal transmission line 20 and has the structure shown in FIG. 7 but including only a pull-up resistor $R_1$, a transistor Tr1, and an inverter 41 and excluding a transistor Tr2, a resistor R2, a resistor R3, and a capacitor C1.

Each slave station 80 has the same structure as each slave station 30 in the case of the second embodiment shown in FIG. 6 as will be described later.

In the first embodiment, the clock pulse signal is always transmitted from the self-contained station 70 on the signal transmission line 20, the data signal from any one of the slave stations 80 being superposed on the clock pulse signal to perform the data transmission/reception to any other slave stations 80. Each slave station 80 extracts the clock pulse signal from the received signal from the signal transmission line 20 to achieve a timing of each operation executed within the corresponding one of the slave stations 80. The self-contained station 70 functions as generating and outputting the clock pulse signal but does not function as transmitting and superposing the data signal onto the clock pulse signal onto the signal transmission line 20. However, each operation in any one of the slave stations 80 is the same as that in the case of the second embodiment which will be described later.

(Second Embodiment)

FIG. 6 shows the second preferred embodiment of the multiplex serial data communication circuit network according to the present invention.

Figure 8:
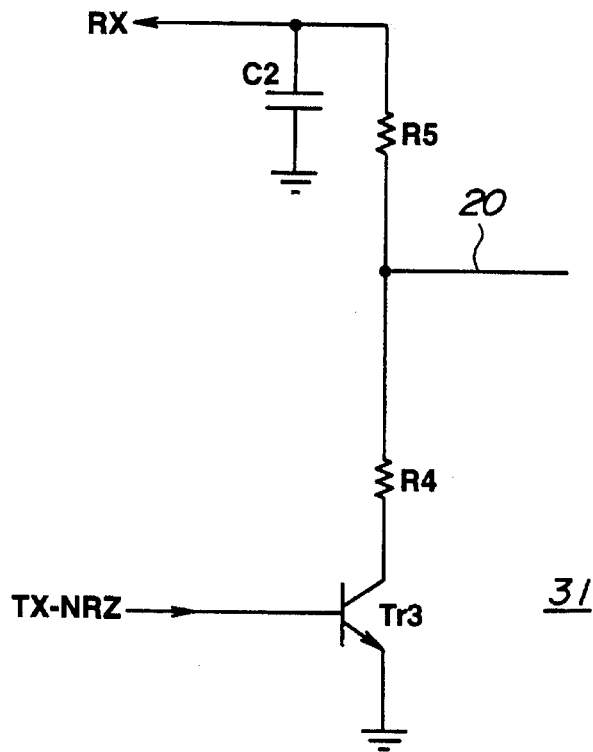
FIG. 8 is a schematic wiring diagram of a transmission/reception circuit 31 shown in FIG. 6.

In FIG. 6, a master station 10 as a first transmission control apparatus is connected to each slave station 30 as each second transmission control apparatus via a single signal transmission line 20. In FIG. 8, the number of slave stations 30 are three, four, or an n-th number of slave stations 30.

The master station 10 includes: the oscillation source 11 constituted by a crystal oscillator generating a sinusoidal wave having a predetermined frequency; the frequency divider 12 constituted by, for example, a plurality of flip-flops shaping the sinusoidal wave into a pulse train signal with its predetermined frequency divided into another predetermined frequency (clock pulse repetition rate) to output the frequency divided clock pulse signal (CLK); the transmission/reception circuit 13 operating on the basis of the generated clock pulse signal; a decoder 14 which is so constructed and arranged as to extract a data signal from the received signals of the transmission/reception circuit 13 and to decode the data signal; and a transmission control block 15 constituted by, for example, a communication IC (Integrated Circuit) or a microcomputer and which is so constructed and arranged as to output the data signal to be transmitted to the corresponding one (or two or any arbitrary number) of the slave stations 30 to the transmission/reception circuit 18. The transmission/reception circuit 18 of the master station 10 performs the data signal transmission and reception and outputs the clock pulse signal from the frequency divider 12 to the signal transmission line 20.

It is noted that each slave station 80 has generally the same structure as shown in FIG. 6.

Each slave station 30 includes: the transmission/reception circuit 81 which is so constructed and arranged as to receive the superposed signals from the signal transmission line 20 and transmit the data signal from its slave station 30; a clock pulse signal extracting block 32 which is so constructed and arranged as to extract the clock pulse signal from the received signals on which the data signal is superposed of the transmission/reception circuit 31; a decoder 33 which is so constructed and arranged as to extract and decode the data signal from the receive signals; and a transmission control block 34 which is so constructed and arranged as to fetch the data signal (DATA) from the decoder 33 thereinto to process it (DATA) and output another data signal to be transmitted to the slave station 10 or any other slave station(s) 30 to the transmission/reception circuit 31, both functions being in synchronization with the clock pulse signal extracted by the clock pulse signal extracting circuit 32. The transmission control block 34 is constituted by the communication IC or microcomputer as described in the case of the transmission control block 15 in the master station 10.

In the second embodiment, only the master station 10 is provided with the clock pulse signal generator 11 and 12 and each slave station 30 is not provided with such the clock pulse signal generator as in the master station 10 of FIG. 6.

FIG. 7 shows the specific circuit structure of the transmission/reception circuit 13 incorporated into the master station 10.

As shown in FIG. 7, the signal transmission line 20 is connected to a constant voltage supply $V_{dd}$ via the pull-up resistor R1, a first transistor Tr1 whose collector is connected to the pull-up resistor R1 and to the signal transmission line 20, whose emitter is grounded, and whose base is connected to the inverted 41. An input end of the inverted 41 receives the clock pulse signal TX-CLK from the frequency divider 12 so that the first transistor Tr1 is turned on to ground the potential on the signal transmission line 20 in response to an inverted signal of the positive clock pulse signal TX-CLK and is turned off to make the potential on the signal transmission line 20 equal to the constant voltage supply $V_{dd}$ in response to the inverted signal of the lowered clock pulse signal TX-CLK.

Furthermore, as shown in FIG. 7, a pull-down resistor R2 is connected to the signal transmission line 20 and a second transistor Tr2 whose emitter grounded, whose collector is connected to the pull-down resistor R2, and whose base receives the data signal TX-NRZ in the form of NRZ (Non-Return to Zero) code from the transmission control block 15. The second transistor Tr2 is turned on or off in response to the data signal TX-NRZ. A resistance value of the pull-down resistor R2 is generally the same as that of the pull-up resistor R1.

It is noted that a filter constituted by a third resistor R3 and a capacitor C1 is connected to the signal transmission line 20 and the signal passed through the filter is retrieved into the decoder 14 as the received signal RX.

FIG. 8 shows a specific structure of the transmission/reception circuit 31 incorporated into each slave station 30.

As shown in FIG. 8, a collector of a third transistor Tr3 in the same way as the second transistor Tr2 in FIG. 7 is connected to the signal transmission line 20 via another pull-down resistor R4. Its emitter is grounded. The third transistor Tr3 is turned on or off in response to a base inputted data signal (TX-NRZ) from the transmission control block 34. In addition, the received signal (RX) from the signal transmission line 20 is passed through another filter constituted by a second capacitor C2 and a resistor R5 and is retrieved into the clock pulse signal extracting circuit 32.

The transmission/reception circuit 31 installed at each slave station 30 has the generally the same structure as transmission/reception circuit 13 installed within the master station 10 except the pull-up resistor R1 and the first transistor Tr1 to transmit the clock signal onto the signal transmission line 20.

Figure 9:
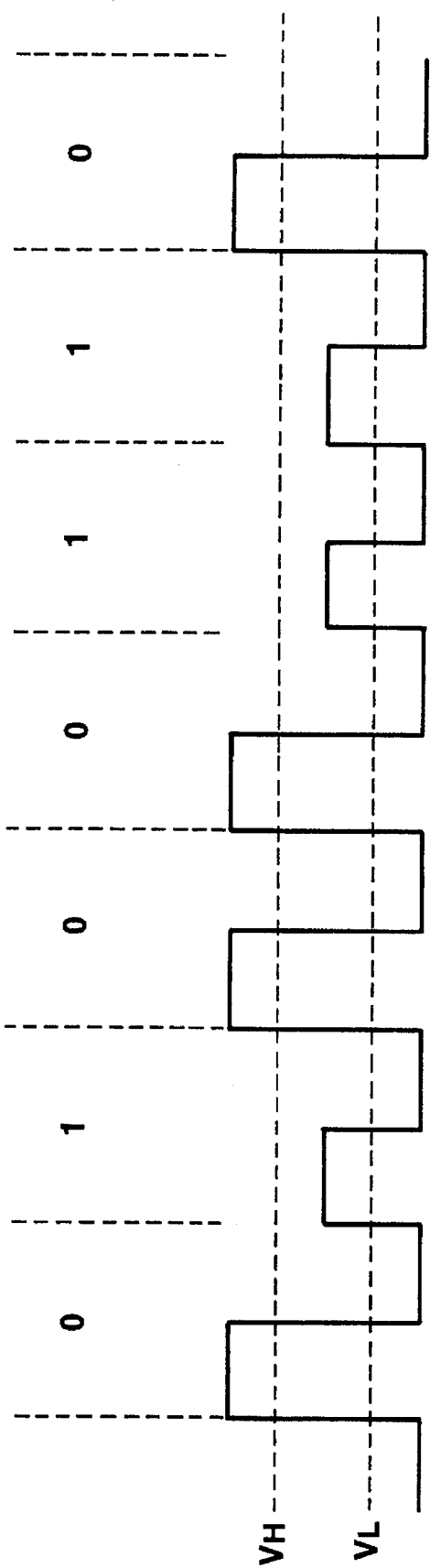
FIG. 9 is an explanatory view of a code transmitted on a signal transmission line 20 in either of FIG. 5 or FIG. 6.

FIG. 9 shows a transmission data format corresponding to a two-value data of "0" and "1" which is applicable to the first and second embodiments of the multiplex serial data communication circuit network according to the present invention.

As shown in FIG. 9, two threshold levels of $V_H$ and $V_L$ are provided ($V_H > V_L > 0$). Then, a pulse having a potential equal to or greater than $V_H$ is determined to be a logic value (bit) "0". A pulse having a potential equal to or greater than $V_L$ and less than $V_H$ is determined to be a logic value (bit) "1".

That is to say, suppose that the data transmission is carried out from the master station 10. In a case where the data of the logic value of "0" is input to the base of the second transistor Tr2 from the transmission control block 15, the second transistor Tr2 is turned off so that the signal transmission line 20 indicates a high level equal to the constant voltage supply $V_{dd}$. On the other hand, in a case where the data of the logic value of "1" is input to the base of the second transistor Tr2 so that the second transistor Tr2 is turned on and the potential of the signal transmission line 20 is an intermediate potential between the constant voltage supply $V_{dd}$ and ground potential, namely, of divided voltage value by the resistors R1 and R2 from the constant voltage value $V_{dd}$. Hence, if the voltage value $V_H$ is set to a value between the constant voltage supply $V_H$ and divided voltage and the voltage value of $V_L$ is set to a value lower than the divided voltage value, the data value can be encoded and transmitted so as to correspond to the potential on the signal transmission line 20 and the identification of data can be carried out at each slave station 20.

Figure 10:
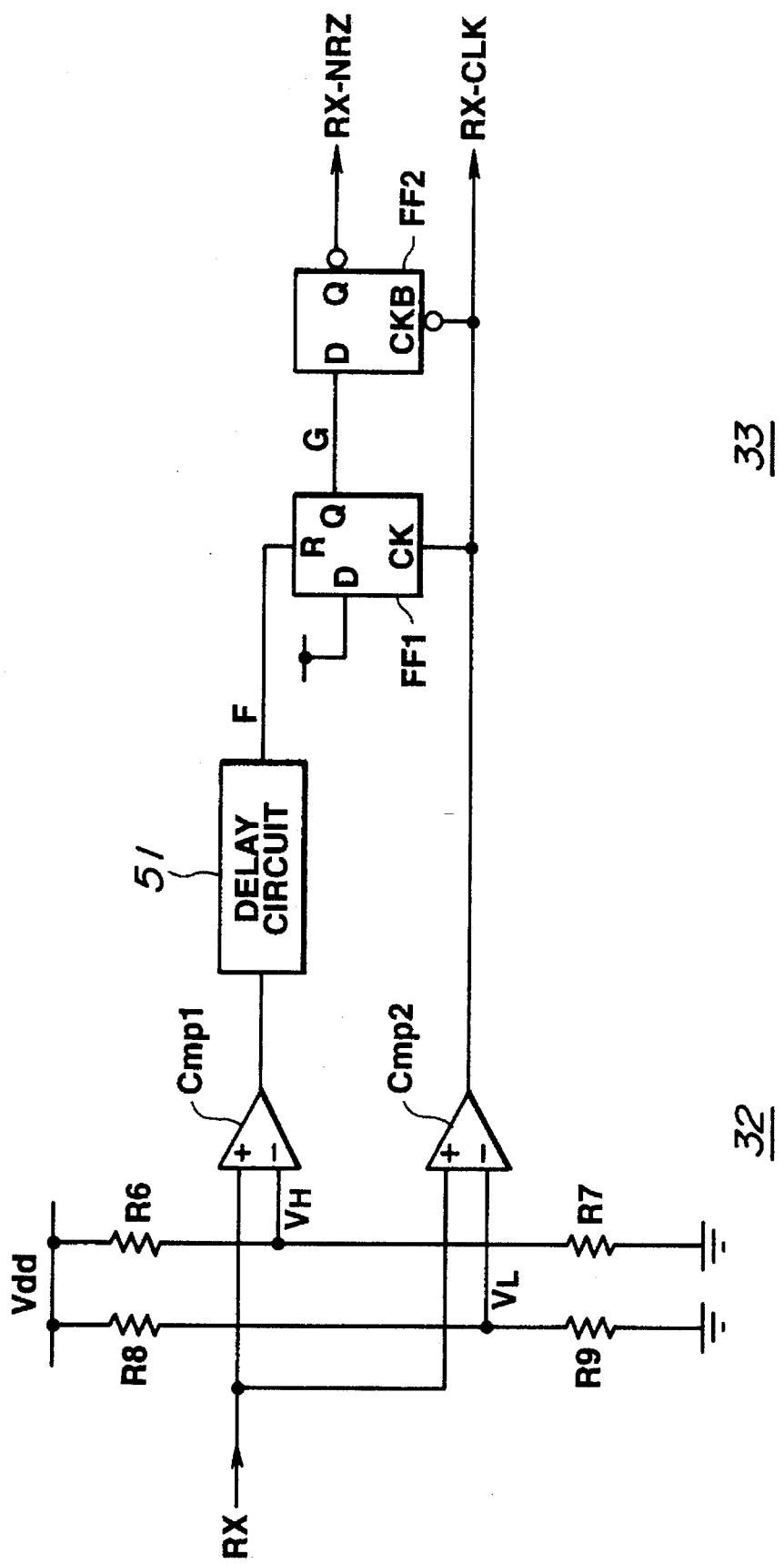
FIG. 10 is a schematic wiring diagram of a clock pulse signal extracting circuit 32 and decoder 33 shown in FIG. 6.

Next, FIG. 10 shows a specific structure of the series-connected clock pulse signal extracting circuit 32 and the decoder 33 in each slave station 30 shown in FIG. 6.

The received signal RX at the transmission/reception circuits 13 and 31 shown in FIG. 7 and FIG. 8 is input to each non-inverting input end of first and second comparators Cmp1 and Cmp2 of the clock pulse signal extracting circuit 32. Each inverting input end of the first and second comparators Cmp1 and Cmp2 receives the voltage values of $V_H$ and $V_L$, respectively.

The voltage value of $V_H$ is generated by dividing the constant voltage supply $V_{dd}$ by means of a sixth resistor R6 and a seventh resistor R7. The voltage value of $V_L$ is generated by dividing the constant voltage supply $V_{dd}$ by means of an eighth resistor R8 and a ninth resistor R9, respectively.

The voltage values of $V_H$ and $V_L$ correspond to the determination threshold values explained with reference to FIG. 9 ($V_H > V_L$).

Figure 1:
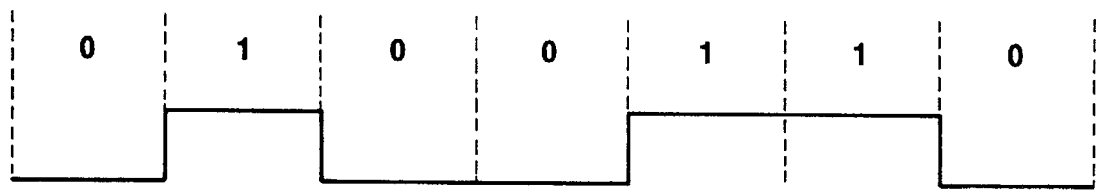
FIG. 1 is an explanatory view of a signal in a NRZ code.
Figure 2:
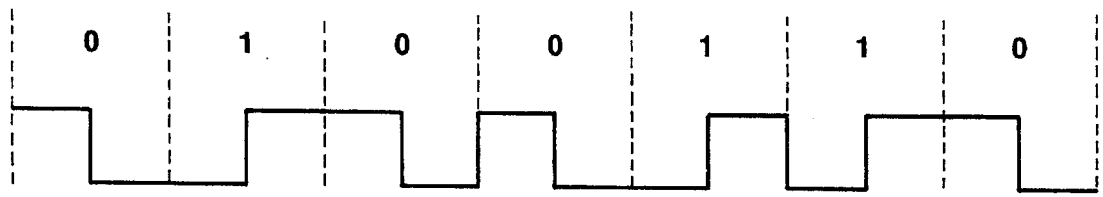
FIG. 2 is an explanatory view of a signal in a Manchester code.
Figure 3:
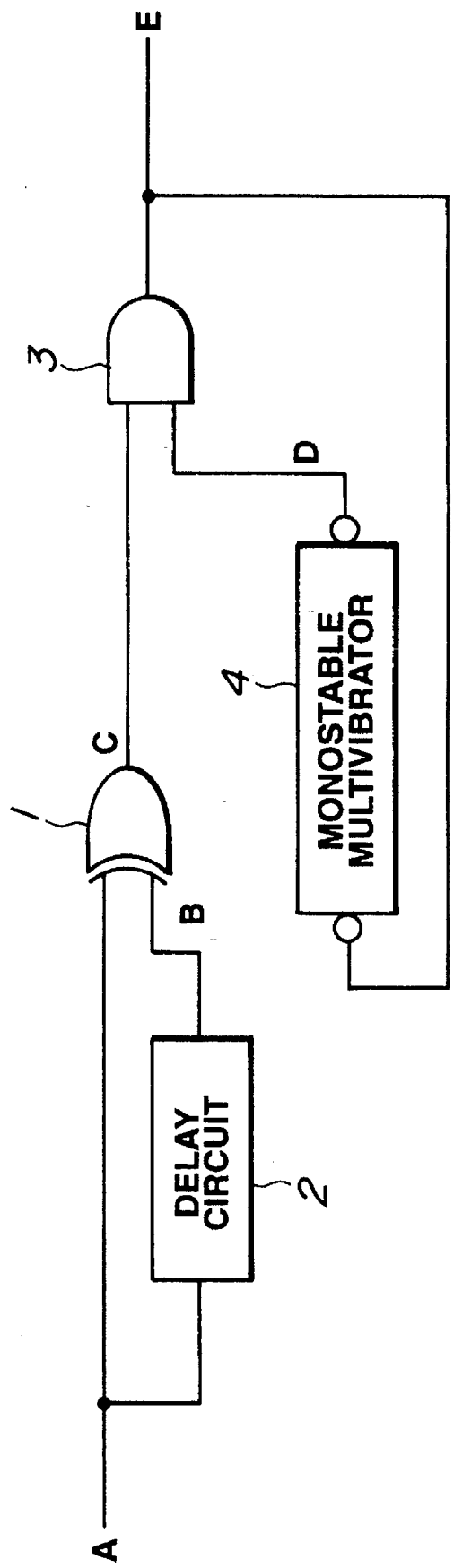
FIG. 3 is a previously proposed clock pulse extracting circuit of the Manchester code signal described in the BACKGROUND OF THE INVENTION.
Figure 4:
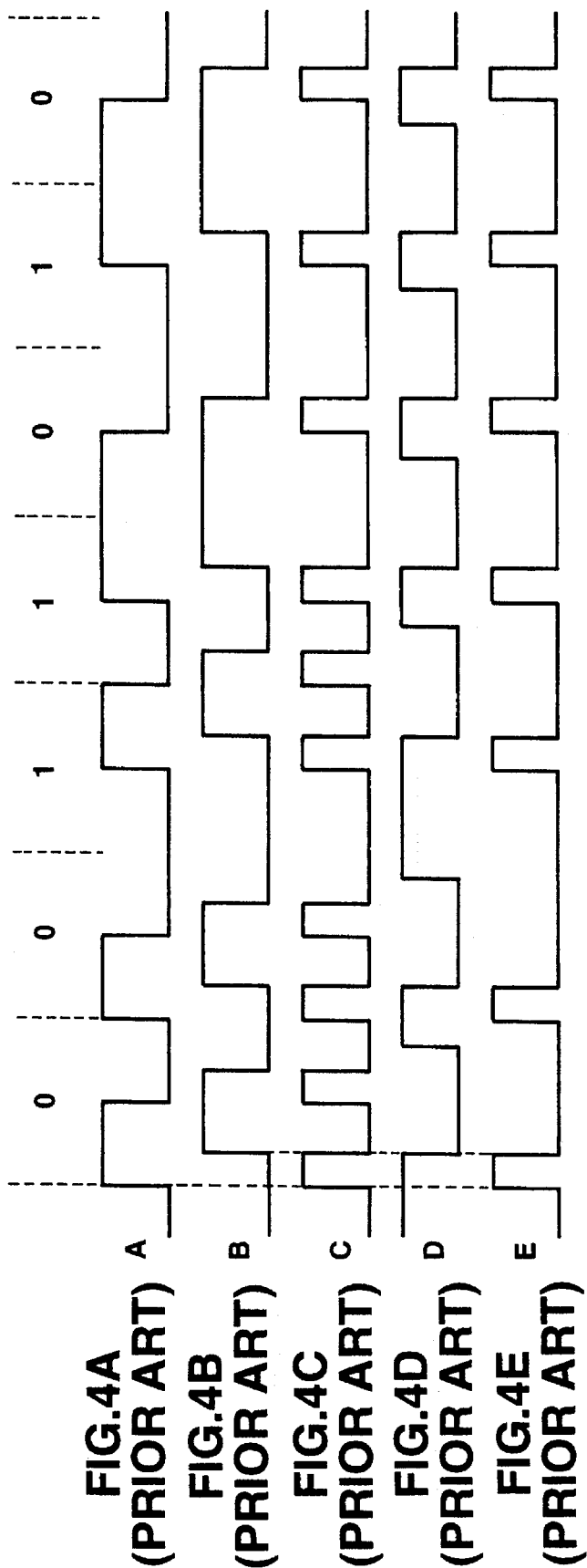
FIGS. 4A, 4B, 4C, 4D, and 4E are integrally signal timing chart for explaining an operation in the previously proposed clock pulse signal extracting circuit shown in FIG. 3.

An output signal of the first comparator Cmp1 is input to a delay circuit 51, for example, constituted by a shift register. An output signal of the delay circuit 51 is supplied to a reset end R of a first flip-flop FF1. An output signal of the second comparator Cmp2 is supplied to a clock end CK of the first flip-flop circuit FF1 as the extracted clock pulse signal RX-CLK. It is noted that the output signal of the second comparator Cmp2 is the pulse signal having a constant period of time irrespective of the data value as shown in FIG. 4. Furthermore, an input end D of the first flip-flop FF1 always receives a fixed voltage of the high level (H) and its output signal G from an output end Q of the first flip-flop FF1 is supplied to an input end D of a second flip-flop FF2. A clock input end CKB of the second flip-flop FF2 receives the clock pulse signal RX-CLK so as to be operated upon a falling edge of the extracted clock signal RX-CLK. Its output of the second flip-flop FF2 is retrieved into the transmission control block 34 as the data signal RX-NRZ in the NRZ code after decoding operation of the decoder 33.

The second comparator Cmp2 and two resistors R8 and R9 constitute the clock pulse signal extracting circuit 32. The first comparator Cmp1, the two resistors R6 and R7, the delay circuit 51, and the two flip-flops constitute the decoder 32.

The decoder 14 installed within the master station 10 has the same structure as the decoder 32 installed within each slave station 30. It is noted that the master station 10 has no structure of the clock pulse signal extracting circuit 32 constituted by the two resistors R8 and R9 and the second comparator Cmp2 shown in FIG. 10.

Next, the operation of the second embodiment will be described below with reference to FIGS. 11A, 11B, and 11C.

As shown in FIG. 11A, in operation, the transmission/reception circuit 13 of the master station 10 always receives the clock pulse signal TX-CLK which is derived by frequency dividing the original frequency for the oscillation source 11 in order to synchronize the whole operation of the multiplex serial data communication circuit network. At this time, the first transistor Tr1 (refer to FIG. 7) is turned on or off in response to the clock pulse signal TX-CLK. When the first transistor Tr1 is turned on, the signal transmission line 20 is grounded and is logically at the low potential level. When the first transistor Tr1 is turned off, the signal transmission line 20 is at the potential approximately equal to the constant voltage supply $V_{dd}$. Hence, the pulse train signal having the potential equal to or larger than $V_L$ and having the same frequency as the clock pulse signal TX-CLK is always output.

When the data transmission of the master station 10 is carried out, the data signal TX-NRZ in the NRZ code such that the change of the data occurs on each rising edge of the clock signal TX-CLK is given to the base of the second transistor Tr2 of the transmission/reception circuit 13. Then, when the clock pulse signal TX-NRZ is logically at the low level (L), the first transistor Tr1 is turned on and the signal transmission line 20 is grounded.

Therefore, since the signal transmission line 20 is grounded at this time, the signal on the signal transmission line 20 indicates the low level (L), irrespective of a state on the transmission data signal TX-NRZ, namely, irrespective of an on or off state of the second transistor Tr2. On the contrary, when the synchronizing clock TX-CLK is at the high level (H), the first transistor Tr1 is turned off. Consequently, the signal level on the signal transmission line 20 changes according to the level state of the transmission data signal TX-NRZ. That is to say, when the transmission data signal TX-NRZ in the NRZ code is at the "0", namely, at the low level (L), the second transistor Tr2 is turned off so that the output level on the signal transmission line 20 approximately equals to the voltage value $V_{dd}$ by means of the pull-up resistor R1. In addition, when the transmission data signal TX-NRZ is logically at "1", namely, at the high level (H) (positive logic system is used), the second transistor Tr2 is turned on so that the intermediate potential of about ½ $V_{dd}$ is output on the signal transmission line 20 due to the voltage division by means of the pull-up resistor R1 and the pull-down resistor R2.

FIG. 11B shows the signal timing chart for explaining the signal level RX on the signal transmission line 20.

FIG. 11C shows the signal timing charts of RX-CLK shown in FIG. 10, of the signal at the point F shown in FIG. 10, of the signal at the point G shown in FIG. 10, and of RX-NRZ shown in FIG. 10.

In this way, the data signal TX-NRZ shown in FIG. 11A is superposed on the clock signal TX-CLK.

Any one of the slave stations 30 which has received the received signal RX shown in FIG. 11B carries out the extraction of the clock pulse signal and decode of the received signal RX by means of the circuitry shown in FIG. 10.

In details, the received signal RX is input to the comparators Cmp1 and Cmp2 shown in FIG. 10, respectively. From the second comparator Cmp2 whose reference potential is at the $V_L$, the pulse signal having the constant period of time, irrespective of the logical values of the received data (irrespective of the potentials on the received signal RX). This pulse signal having the constant period is used for a sampling clock for the received data and an internal logic operation of the corresponding one of the slave stations 30 as the extracted clock signal RX-CLK. On the other hand, since the reference potential of the first comparator Cmp1 is at $V_H$, the pulse signal is output only when the received data is at the level of "0" (namely, when the received signal RX is at the high potential as shown in FIG. 9). The output signal of the first comparator Cmp1 is delayed by means of the delay circuit S1 and is input to the reset terminal of the first flip-flop circuit FF1 as the signal F. Therefore, even if the output signal at the point G of the first flip-flop circuit FF1 is at the high level (H) upon the rising edge of the extracted clock signal RX-CLK, the output signal at the point G turns to the low level (L) after a constant delay time.

The second flip-flop circuit FF2 samples the output signal at the point G of the first flip-flop circuit FF1 in synchronization with the falling edge of the extracted clock signal RX-CLK. That is to say, since the second flip-flop circuit FF2 holds the input (signal G) state when the extracted clock signal RX-CLK falls. This output of the second flip-flop circuit FF2 serves as the received data signal RX-NRZ in the NRZ code after the decoding operation and is fetched into the transmission control block 34. The extracted clock signal RX-CLK is output to the transmission control block 34 in addition to the decoded received data signal and is used for the synchronization purpose for the control operation and transmission operation at the corresponding one of the slave stations 30.

The data transmission of the corresponding one of the slave stations 30 to the master station 10 is carried out in the same way as the above-described data reception operation except that the output of the synchronization clock signal TR-CLK (is still carried out by the master station 10. Then, the intermediate potential (when the data value is at the logical value of "1") is determined according to the divided voltage value of the pull-up resistor R1 and the pull-down resistor R4 at the corresponding one of the slave stations 30. In the data transmission operation at the corresponding one of the slave stations, the transmission data can be changed on the rising edge of the extracted clock pulse signal RX-CLK in the same way as the transmission data signal TX-NRZ at the master station 10 shown in FIG. 11A. However, since the master station 10 is provided with the oscillation source 11, it is not necessary to extract the clock pulse signal from the received signal RX. Using the clock pulse signal TX-CLK generated by itself (namely, the master station 10), the decoder 14 and transmission control block 15 are controlled.

As described above, the oscillation source 11 is provided only with the master station 10 and the clock information is output onto the signal transmission line 20. At each of the slave stations 30 in which no ocsillation source 11 is provided, the clock information is extracted from the signal on the signal transmission line 20 and all of the processing operations of the slave station 30 itself are based on the extracted clock pulse signal. Hence, since the oscillation source 11 is provided within only one station of the master and slave stations 10 and 30 constituting the data communication circuit network, the advantage of enabling the cost of installing the above-described serial data communication circuit network can be achieved as compared with the previously proposed data communication circuit network in which the individual oscillation sources as the time reference are provided for all of the slave stations.

If a technique such that the transmission data is generated according to a variation in an amplitude of a carrier wave is considered, a transmission data such as using an amplitude modulation (AM) method with the sinusoidal wave as the carrier wave can be exemplified. However, since no synchronization relationship is present between the carrier wave and the transmission data, it is generally necessary go have the frequency of the carrier wave sufficiently larger than that of the carrier wave. In addition, since the above-described technique is based on an analog transmission technique using the analog signal, the whole circuit configuration becomes complex. On the other hand, since, in the first and second embodiments, the carrier wave is the clock pulse signal of the digital signal waveform always outputted onto the signal transmission line 20, a half-duplex bi-directional data transmission can be achieved by taking the synchronization from the clock pulse signal with a simple circuit structure. In addition, with the digital technique as a concept of the present invention, the whole circuit configuration is simple and is easy to be fabricated into the integrated circuit. Hence, its feature is different from the AM technique.

FIGS. 12A, 12B, 12C, 12D, and 12E show code formats used in the serial data communication circuit network in the first and second embodiments shown in FIGS. 5 and 6, respectively, having a transparency. It is noted that the transparency in the data transmission means a capability of a communication medium to pass within specified limits a range of signals having one or more defined properties, for example, a channel may be code transparent, or an equipment may be bit pattern transparent.

Figure 12A:
FIGS. 12A, 12B, 12C, 12D, and 12E are explanatory view of encoded data signals adopted in the second embodiment shown in FIG. 6.
Figure 12B:
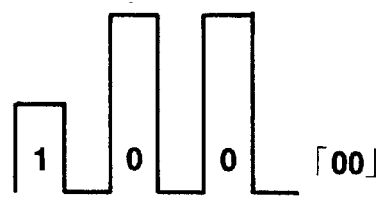
Figure 12C:
Figure 12D:
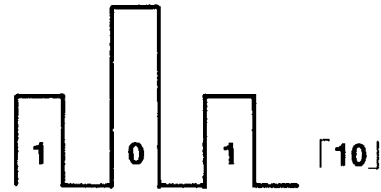
Figure 12E:
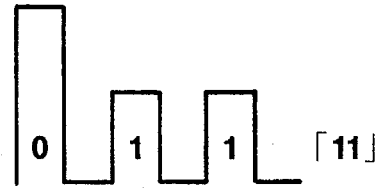

As shown in FIG. 12A, SOM (Start of Message) indicating the start of communication is "1 1 1" pulse. As shown in FIG. 12B, the data of "00" is "100" pulse. As shown in FIG. 12C, the data of "01" is "110" pulse. As shown in FIG. 12D, the data of "10" is "101" pulse. As shown in FIG. 12E, the data of "11" is "0 1 1". In those ways, the data of two bits is expressed by three consecutive pulses.

In a case where the data transmission is carried out using the above-described codes shown in FIGS. 12A through 12E, the second transistor Tr2 in the transmission/reception circuit shown in FIG. 7 of each slave station 30 is turned off so that only high voltage potential is continuously output on the transmission line 20 corresponding to the logic value of "0" exceeding the level of $V_H$ during no communication state. When the low voltage pulses corresponding to the logic value of "1" are received consecutively three times, the code of [SOM] is detected so that the subsequent signal can be fetched thereinto (transmission control block 34).

(Modification of Second Embodiment)

Figure 13:
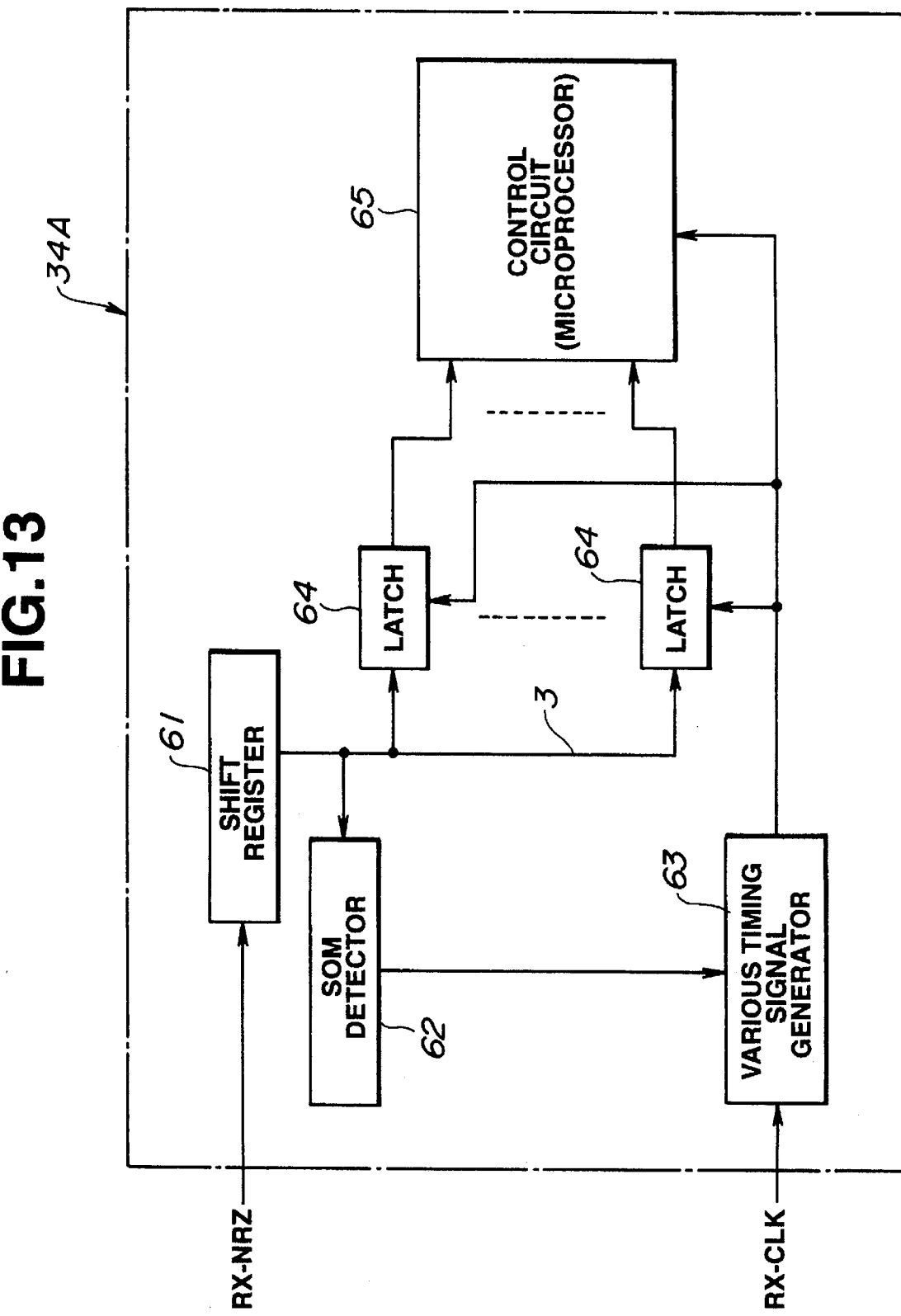
FIG. 13 is an example 34A of a transmission control block 34 shown in FIG. 6.

FIG. 13 shows a modification of the second embodiment in which the transmission control block 34A is used when the serial data communication circuit network adopts the code formats shown in FIGS. 12A through 12E. That is to say, the circuit structure shown in FIG. 13 is the transmission control block 34 of each slave station.

The data signal RX-NRZ converted into the NRZ code by means of the decoder 33 is converted into three-bit parallel data by means of a shift register 61 in the transmission control block 34A. When the three-bit data are turned to "111", the SOM detection signal from the SOM detection circuit 62 is output to a control timing signal generator 63. Upon receipt of this output, the operation on the control signal timing generator 63 is initiated. Various types of timing signals are generated by the control signal timing generator 63 on the basis of the extracted clock pulse signal RX-CLK extracted from the decoder 33 to control each latch 64 --- and to control a control circuit 65. Thereafter, the latches of the three-bit received data and controls from the shift register 31 are carried out. It is noted that, in place of the extracted clock signal RX-CLK, the master station 10 uses the clock pulse signal TX-CLK derived by frequency dividing the original oscillation signal from the oscillation source. The data processing method at the master station is the same as that used in each slave station 30.

According to the structures in the serial data communication circuit network, the presence or absence of the data on the transmission line 20 can easily be determined. Such a procedure as a contention method in which each station transmits the data asynchronously may be adopted.

It is of course that an EOM (End of Message) code may be attached to a trailing end of the transmission data signal TX-NRZ to indicate the end of the data to be transmitted.

(First Example)

Figure 14:
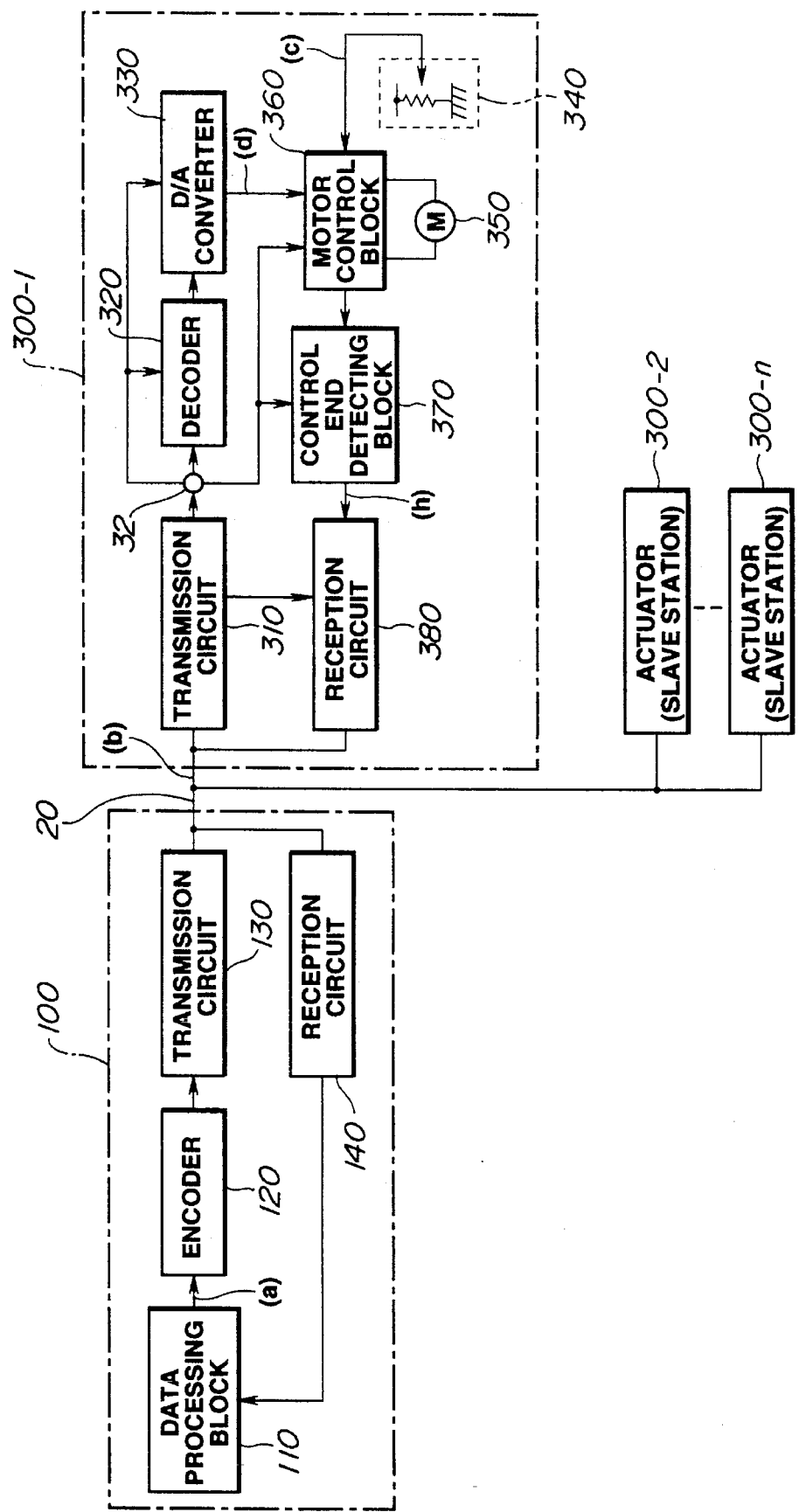
FIG. 14 is a circuit block diagram of a first example of motor control system to which the multiplex serial data communication circuit network according to the present invention is applicable.

FIG. 14 shows a first example of a motor control system using the serial data communication circuit network in the second embodiment.

A control unit 100 serves as the master station 10, namely, the first transmission control apparatus. Each second control unit 300-1, 300-2, --, 300-n serves as an actuator, namely, the slave station (second transmission control apparatus) having a motor 35 to be controlled. The motor 35, for example, is used for changing a position of an air mixing door between an inner air circulation position and an outer air circulation position. The air mixing door is disposed in, for example, an automotive vehicle air-conditioner so that a rotational angular displacement of the air mixing door is controlled. (The DC motor used for controlling an angular position of the air mixing door for its actuator is exemplified by a Japanese Service Manual "Nissan President" (JHG50-1) published on October, 1990.) In addition, the actuators 300-1 through 300-n are disposed at a position of the vehicle remote from the first control unit 100.

The first control unit 100 is connected to each actuator 300-1, 300-2, ---, 300-n via the single signal transmission line 20 as described in the case of the second embodiment.

The first control unit 100 includes: a data processing block 110; an encoder 120 which is so constructed and arranged as to receive the data from the data processing block 110 and to convert the encoded data signal into a predetermined data code and format; a transmission circuit 130 which is so constructed and arranged as to output the encoded data coded by means of the encoder 120 to the single signal transmission line 20; and a reception circuit, 140 which is so constructed and arranged as to receive the signal on the single signal transmission line 20.

Figure 15A:
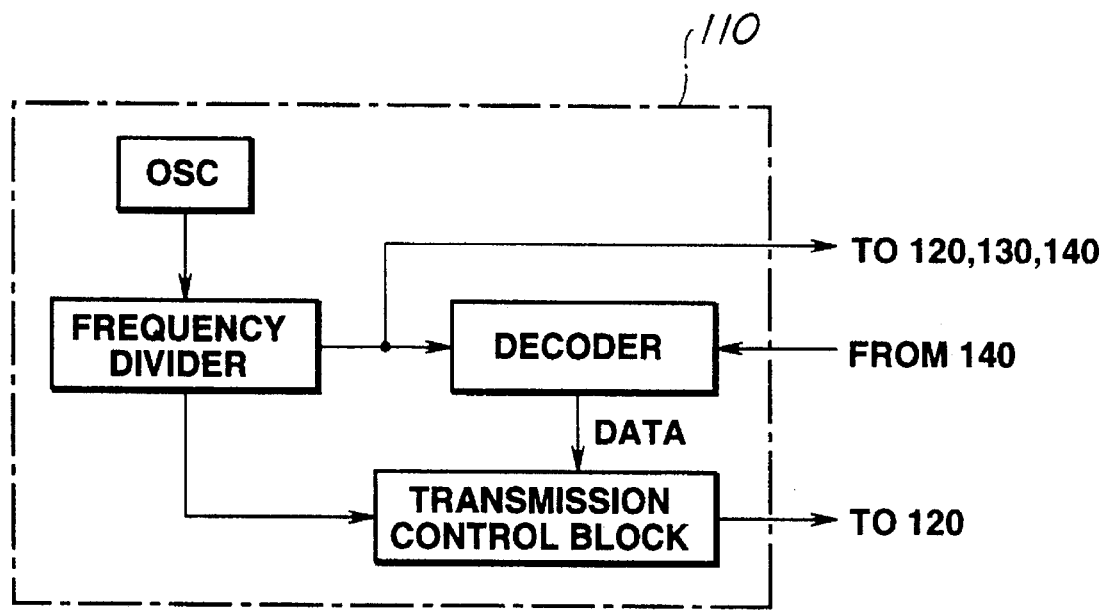
FIG. 15A is a circuit block diagram of an example of a data processing block 110 shown in FIG. 14.

It is noted that FIG. 15A shows an example of the data processing block 110 in the first control unit 100.

Figure 15B:
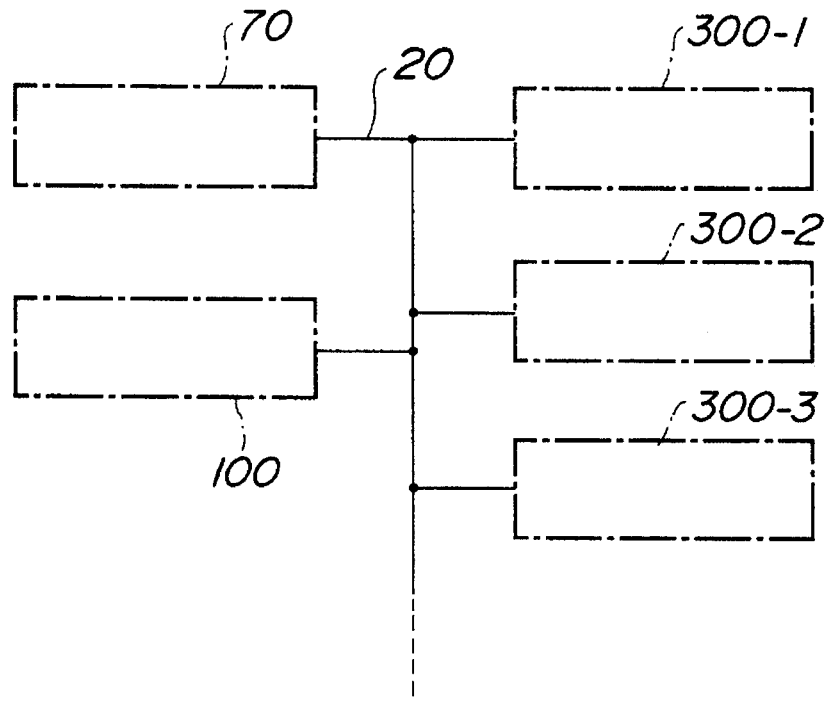
FIG. 15B is a simplified circuit block diagram of another example of a whole configuration of the multiplex serial data communication circuit network shown in FIG. 14.

It is also noted that FIG. 15B shows another example of the whole system configuration of the first example in which the self-contained station 70 described in the first embodiment is connected to the single signal transmission line together with the first control unit 100 and the actuators 300-1, 300-2, 300-3, ---.

Figure 17:
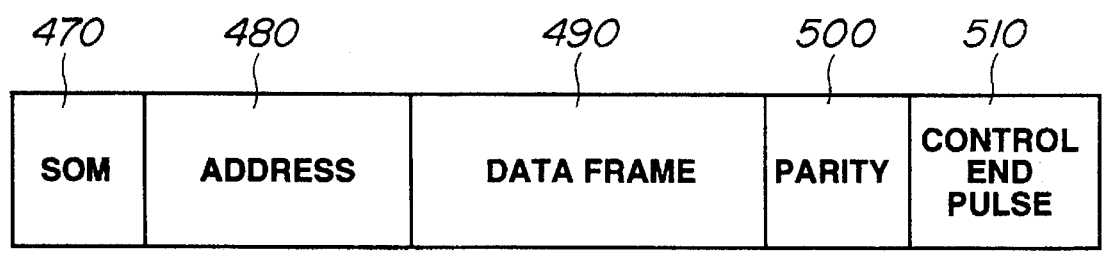
FIG. 17 is an explanatory view of a data format used in the first example shown in FIG. 14.

FIG. 17 shows a data transmission format adopted in the signal transmission line 20 in the first example shown in FIG. 14.

The data transmission format includes: SOM (Start of Message) 470 code to indicate the start of the data transmission; an address frame 480 indicating an address of one of the actuators to be transmitted; a data frame 490 indicating the data related to a target value of the motor rotational angular displacement; and a parity bit 500 used for detecting whether an abnormal transmission of the data occurs. The final one bit after the parity bit 500 is a control end pulse 510 as a control end data and is added subsequently to the parity bit 500 by any addressed one of the actuators 300-1, 300-2, ---, 300-n. The details of the control end data 510 will be described later.

In the first example, a value calculated so that [5 V–target value (V)] is indicated in terms of the structural requirement of the motor control block 360 is set onto the data frame 490.

Each of the actuators 300-1, 300-2, ---, 300-n are constituted by the reception circuit 310, the decoder 320, an D/A converter 330, a motor (DC reversible motor) 350, a rotational angle detecting block 360, a control end detecting block 370, and a transmission circuit 380.

The reception circuit 310 receives the transmitted data on the signal transmission line 20, supplies the received data to the decoder 320 via the clock pulse signal extracting circuit 32, and outputs a received completion signal to the transmission circuit 380 upon an end of the receipt of the transmitted data.

The decoder 320 serves to decode the transmitted data derived by the reception circuit 310.

The D/A converter 880 is converted into an analog value corresponding to a value of the data frame 490 from among the transmitted data decoded by means of the decoder 320.

The rotational angle detecting block 340 is constituted by a variable resistor whose resistance value is varied with the rotation of the motor 350.

The variable resistor converts the rotational angle (the rotational angular displacement) of the motor 350 into a corresponding voltage value.

The motor control block 360 serves to control the rotational angle on the basis of the output value of the D/A converter 330 and output value of the rotational angle detecting block 340 so that a present value of the rotational angle of the motor control block 360 gives approximately to the target value. The control end detecting block 370 serves to detect an end of a control on the motor control block 36.

Figure 16:
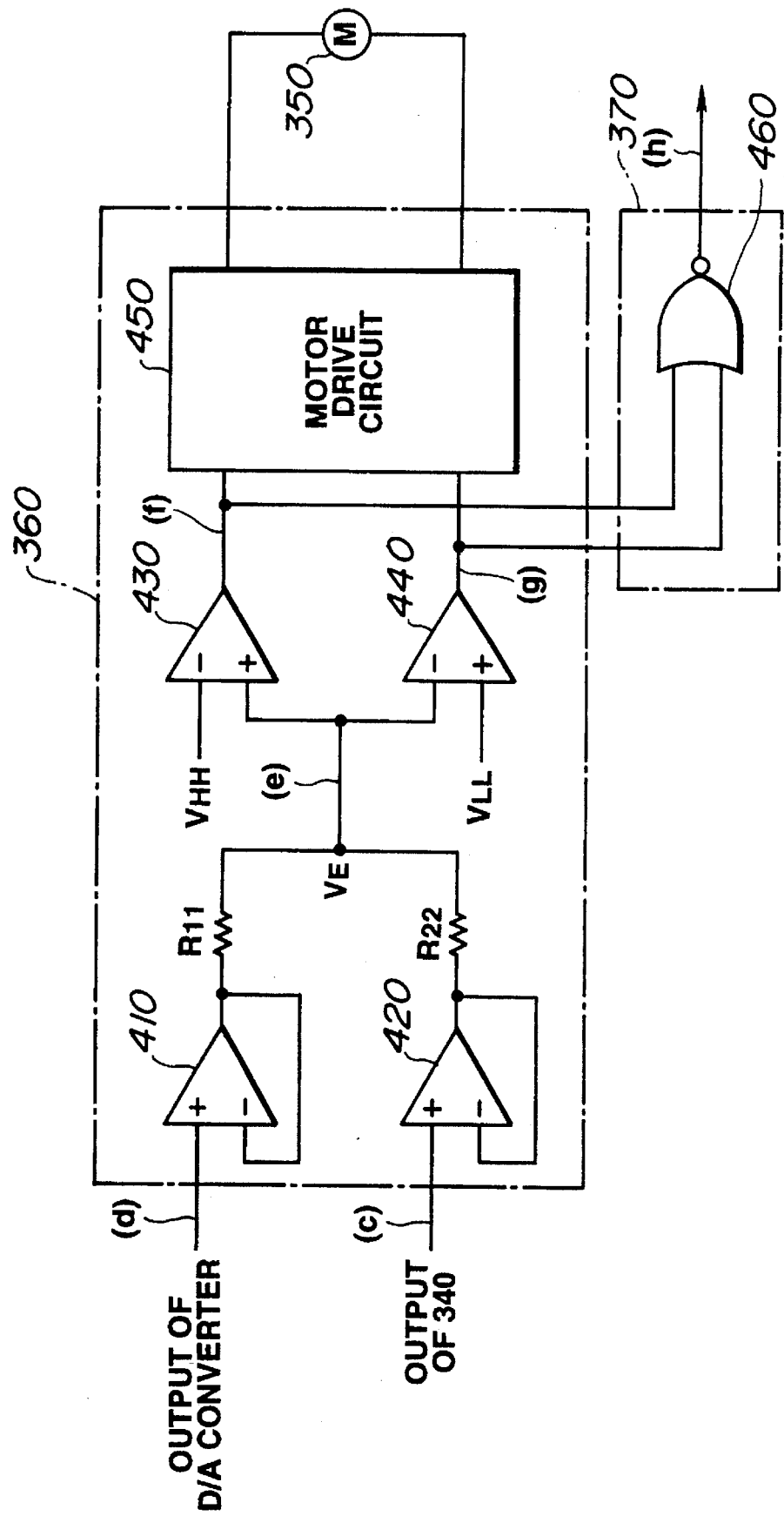
FIG. 16 is a circuit wiring diagram of an example of a motor control block 360 shown in FIG. 34.

FIG. 16 shows an example of a structure of the motor control block 360 and control end detecting block 370, the motor 350 inclusive, of any one of the actuators 300.

The motor control block 360, as shown in FIG. 16, includes: an averaging circuit to average both output values of the rotational angle detecting block 340 and D/A converter 330; a window comparator; and a motor drive circuit 450 connected across the motor 350.

The averaging circuit is constituted by operational amplifiers 410 and 420 and two resistors $R_{11}$ and $R_{22}$, the operational amplifiers 410 and 420 respectively constituting voltage followers as shown in FIG. 16 and respectively receiving the output values of the D/A converter 330 and rotational angle detecting block 340 at their non-inverting ends. Output values of the operational amplifiers are averaged at a junction between the resistors $R_{11}$ and $R_{22}$. The window comparator is constituted by two comparators 430 and 440. The averaged value, namely, the voltage $V_E$ shown in FIG. 16 is compared with predetermined threshold values $V_{HH}$ and $V_{LL}$, respectively. The motor drive circuit 450 controls a rotation of the motor 350 on the basis of output values of the comparators 430 and 440.

The motor drive circuit 450 drives and controls the rotation of the motor 350 on the basis of the output value of the window comparator constituted by the two comparators 430 and 440.

It is noted that in a case where the present value of the motor rotational angle and its target value are coincident with each other, the averaged value $V_E$ between the output values of the D/A converter 330 and rotational angle detecting block 340 is always set to 2.5 volts. Thus, the threshold values $V_{HH}$ and $V_{LL}$ of each comparator 430 and 440 are commonly set so that 2.5 volts is interposed between the two threshold values $V_{HH}$ and $V_{LL}$. At this time, a difference between the two threshold values ($V_{HH}-V_{LL}$) is determined with a required stopped positional accuracy and overrun characteristic of the motor 350.

On the other hand, the control end detecting block 370 is constituted a NOR gate 460 which is so constructed and arranged as to receive results comparisons by means of the two comparators 430 and 440 and to output the logical NORed result of the NOR gate 460.

It is noted that the transmission circuit 380 serves to add the one-bit pulse 510 to the trailing end of the transmission data received by the reception circuit 310 when the reception end signal is received from the reception circuit 310, if the output value of the control end detecting block 370 is at the high level (Hi). On the contrary, if the output value of the control end detecting block 370 is at the low level (Lo), the transmission circuit 380 does not add this one-bit pulse.

Next, an operation of the first example of the motor control system representatively shown by FIGS. 14 and 16 will be described with reference to FIGS. 18A through 18H.

Suppose herein such a case that the motor 350 is rotated until the output value of the rotational angle detecting block 340 indicates the target value of 4 volts when the output value of the rotational detecting block 340 indicates 0 volts (this is the present value).

The data processing block 110 of the first control unit 100 sets the target value (a) of the motor rotational angle in accordance with the transmission format shown in FIG. 17.

Figure 18:
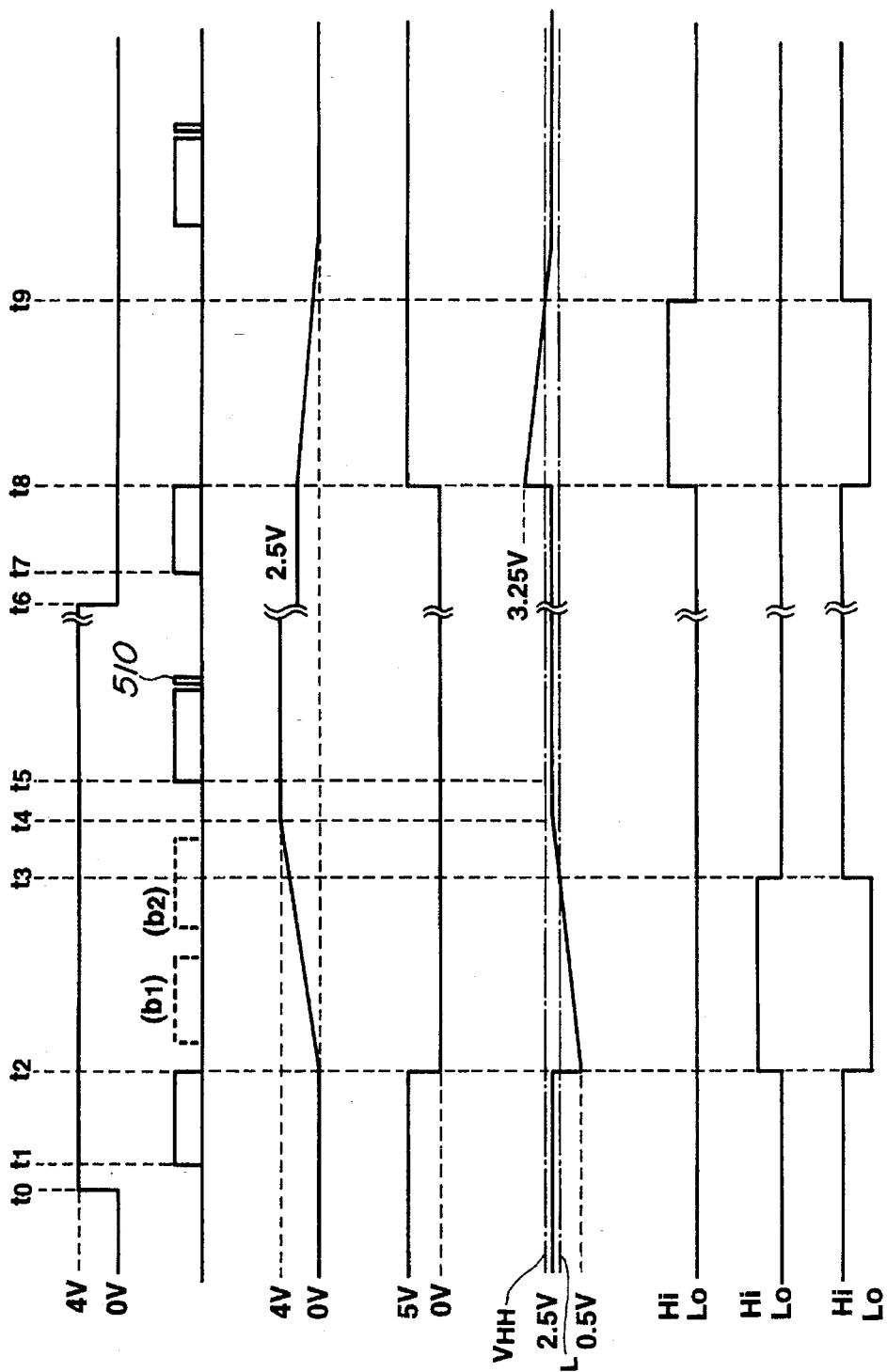
FIGS. 18A through 18H are integrally a signal timing chart for explaining an operation of the first example shown in FIG. 14.

As described above, the value set on the data frame 490 is the value calculated by [5 V−target value (V)]. In this case, since the target value is 4 volts, the value of the data frame 490 gives 1 volt (V). The transmitted data (b) shown in FIG. 18B is output on the signal transmission line 20 via the encoder 120 and transmission circuit 130 of the first control unit 100. It is noted that (b1) and (b2) are transmitted data to any others of the actuators 300-2 through 300-n than the first actuator 300-1. These data (b1) and (b2) are output from the first control unit 100.

When the reception circuit 310 of the addressed actuator 300-1 according to the address specified in the address part 480 of the transmitted data at a $t_1$ receives this data (b), the transmitted data (b) is decoded by means of the decoder 320 and is converted into the corresponding analog value of the value of the data frame 490 by means of the D/A converter at a time $t_2$ at which the reception of the data is ended. In the initial state, since the output (c) of the rotational angle detecting block 340 shown in FIG. 18C indicates 0 volts, the output (d) of the D/A converter 330 is changed from 5 volts (V) of the initial value to 1 volt (V).

The operational amplifiers 410 and 420 of the motor control block 360 receive the output value 1 (V) of the D/A converter 330 and output value of 0 (V) of the rotational angle detecting block 340, respectively. Hence, both outputs (c) and (d) are averaged so that the average value $V_E$=0.5 (V) is input to each comparator 430 and 440, as shown in FIG. 18E. The average value $V_E$ is compared with each threshold value $V_H$ and $V_L$ of the corresponding one of the comparators 430 and 440.

Since, in this case, $V_E<V_L(<V_H)$, the outputs (f) and (g) of the comparators 430 and 440 are respectively at the low level (Lo) and high level (Hi), the motor drive circuit 450, receiving these outputs of the comparators 430 and 440, drives the motor 350 to be rotated in a predetermined direction.

When the output voltage (c) of the rotational angle detecting block 340 rises in accordance with the rotation of the motor 35 and indicates such inequalities as $V_{LL}<V_E<V_{HH}$ at a time of $t_3$, both of the output voltages of (f) and (g) of the two comparators 430 and 440 indicate the low levels (Lo) and the motor drive circuit 450 stops the motor 350.

At this time, since the control end detecting block 370 takes the logical NOR between the output voltages (f) and (g) of the two comparators 430 and 440, the output voltage (h) of the control end detecting block 370 goes high level (Hi) indicating that the control of the motor 350 is ended.

At a time $t_5$ after the control end, the first control unit 100 outputs the transmitted data (b) from the first control unit 100, the reception circuit 310 outputs the reception end signal to the transmission circuit 380 upon completion of the reception of the transmitted data. The transmission circuit 380 receives the reception end signal from the reception circuit 310 and operates to add the one-bit pulse 510 indicating the end of the control to the trailing portion of the transmitted data (b) of the transmission data format shown in FIG. 17, since the output signal of the control end detecting block 370 indicates high level (Hi). On the contrary, if the output signal of the control end detecting block 370 is at the low level (Lo), no control end pulse 510 is added to the trailing portion of the transmitted data.

On the other hand, the first control unit 100 confirms whether the control end pulse 510 is added to the trailing portion of the transmitted data (b) or not whenever the first control unit 100 carries out the data transmission to any one of the actuators 300-1 through 300-n. If the control end pulse 510 is added thereto, the first control unit 100 detects the control end of the motor 350.

Next, in a case where the motor is rotated in the opposite direction to the above-described predetermined direction from a state where the output voltage (c) of the rotational angle detecting block 340 indicates 2.5 volts and the motor 350 stops to a state where the output voltage (c) of the rotational angle detecting block 340 indicates the target value 0 V, the value of the data frame 490 calculated as [5−target value (V)] is expressed as 5−0=5. The transmission data (b) is output onto the signal transmission line 20 via the encoder 120 and transmission circuit 130.

At a time $t_7$, any one 300-1 of the actuators 300 whose address is specified by the first control unit 100 receives the transmitted data (b). Then, at a time $t_8$, the reception of the transmitted data is ended. At this time, the output voltage (d) of the D/A converter 330 changes from 1 (V) to 5 (V). In the motor control block 360, the averaging circuit constituted by the operational amplifiers 410 and 420 and resistors $R_{11}$ and $R_{22}$ serves to average the output voltage values (c) (=5 (V)) and (d) (=2.5 (V)) of the D/A converter 330 and rotational angle detecting block 340 so that its average value $V_E=(5+2.5)\div 2=3.25$ V is input to the respective comparators 430 and 440.

As the result of the comparison between the two comparators 430 and 440, $(V_L<)$ $V_H<V_E$. Therefore, the output voltages (f) and (g) (refer to FIGS. 18F and 18G) indicates the high level (Hi) and low level (Lo), respectively, so that the motor drive circuit 450, in turn, drives the motor 350 to rotate in the opposition direction to the above-described predetermined direction. In this case, the output voltage value of the rotational angle detecting block 340 falls in accordance with the rotation of the motor 350. At a time $t_9$, if $V_{LL}<V_E<V_{HH}$, both of the output voltages (f) and (g) of the comparators 430 and 440 indicate the low level (Lo), thereby the motor drive circuit 450 stopping the motor 350. It is noted that the rotation of the motor 350, herein, is such that the motor 350 overruns and stops due to a rotational inertia moment that the motor 350 itself has (at a time $t_4$).

Thereafter, the control end detecting block 370 provides the high-level (Hi) output signal (h) so that the transmission circuit 380 adds the control end pulse 510 to the trailing portion of the transmitted data (b) and transmits the transmitted data (b) onto the signal transmission line 20. The first control unit 100 detects the addition of the control end pulse 510 and determines that the control of the motor 350 is ended.

The first control unit 100 receives such a diagnostic information as described above from each actuator 300-1 through 300-n.

It is noted that since it takes some time to sufficiently operate the motor 350 due to its inertia moment of the motor 350, it often follows that the control end pulse 510 is not immediately added to the trailing portion of the transmitted data at the first data transmission from the addressed actuator to the first control unit 100. However, in a case where the control end pulse 510 is not added even if the transmission to the same actuator 300 is again carried out after a sufficient time to operate the motor 350 has passed, the first control unit 100 determines that a failure occurs in the same addressed actuator 300.

Since, in the first example, the control end detecting block 370 which detects that the motor control is ended is incorporated into each actuator 300-1 through 300-n and the diagnosing operation to detect the failure occurrence is carried out in such a way that each actuator adds the control end pulse 510 to the trailing portion of the transmitted data and does not add the control end pulse if the control thereof is not ended, it is not necessary to install a complex A/D converter and/or a complex encoder in each of the actuators 300-1 through 300-n. In addition, since the first control unit 100 can only check to see if the control end pulse is added to the transmitted data, it is not necessary to add an exclusively-used decoder for the control end pulse. Hence, a circuit scale can become small and a cost reduction and an easiness in integration of the whole circuit of each of the first control unit and actuators can be achieved.

Furthermore, since the first control unit 100 carries out a self-diagnostic operation whenever the transmitted data to any one of the actuators 300-1 through 300-n and a communication frame length of the transmitted data is hardly changed, the number of times the communications of data are carried out becomes possible and its preferable data responsive characteristic can be achieved.

Although, in the first example of the motor control system, the control end pulse 510 is one bit, is not necessary to limit the number of pulses to one bit. For example, the control end pulse has a plurality of bits for which a redundancy is provided (e.g., CRC (Cyclic Redundancy Check) or another special check code) in order to prevent an erroneous determination of the presence of the control pulse due to an invasion of an external noise onto the whole circuit network. Alternatively, a special code may be added as the control end pulse.

In addition, it is not necessary for the control end pulse to be added to the trailing portion of the transmitted data. For example, a frame into which the control end pulse is added in a mid portion of the transmission format (refer to FIG. 17) may be interposed in an intermediate (specified) portion of the data format and the control end signal may be output at the specified portion from any one of the actuators 300-1 through 300-n during the reception of the transmitted data.

(Second Example)

Figure 19:
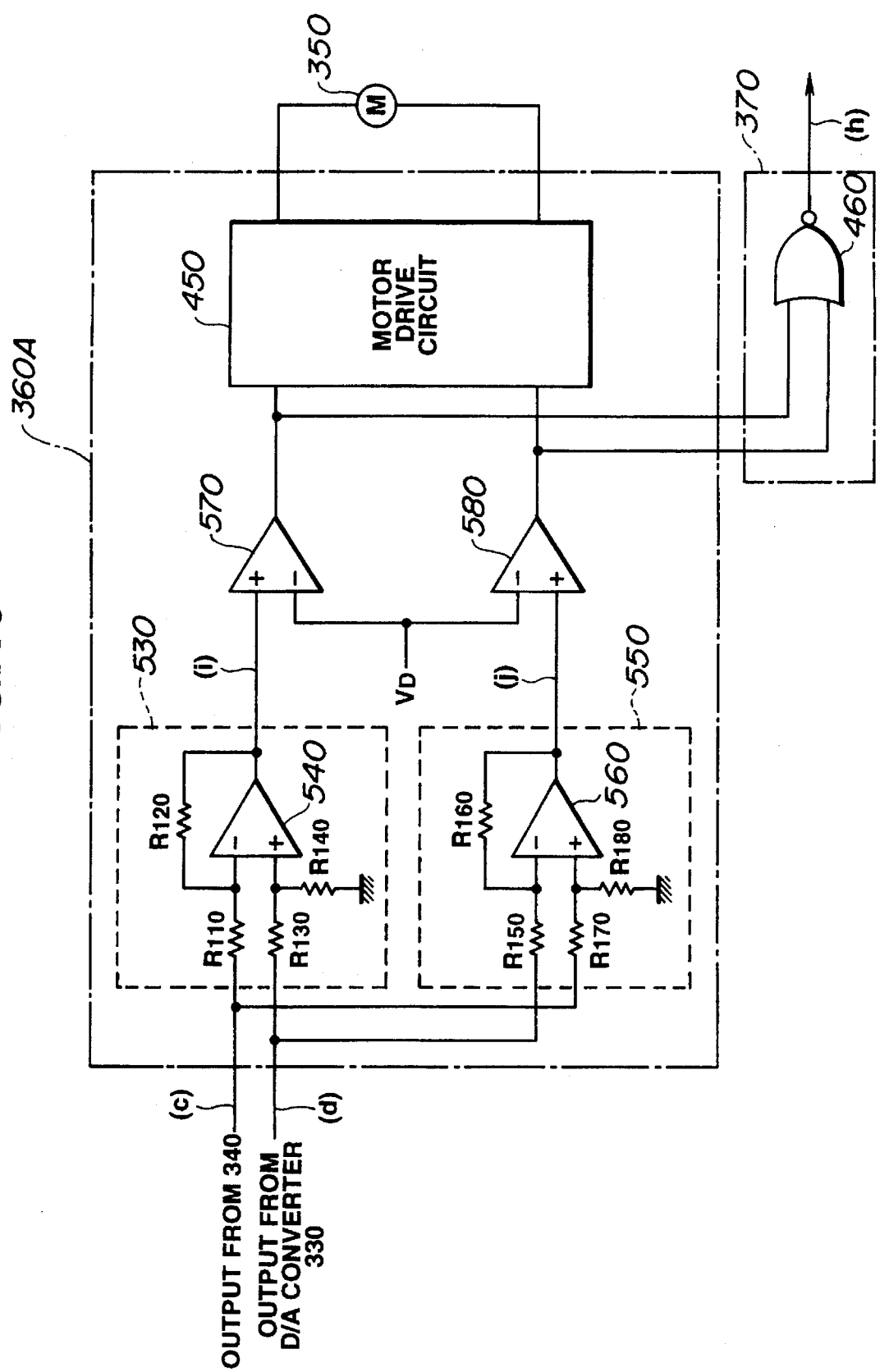
FIG. 19 is a circuit wiring diagram of another (second) example 360A of the motor control block 360 shown in FIG. 14.

In a second example of the motor control system, first and second subtracting circuits 530 and 550 are used in the motor control block 360A shown in FIG. 19.

The first subtracting circuit 530 of the motor control block 360A includes: an operational amplifier 540 connected with resistors $R_{120}$, $R_{110}$, $R_{130}$, and $R_{140}$.

The second subtracting circuit 550 of the motor control block 360A includes: an operational amplifier 560 connected with resistors $R_{150}$ through $R_{180}$.

It is noted that resistance values of the resistors $R_{110}$, $R_{130}$, $R_{150}$, and $R_{170}$ are equal to each other and respective resistance values of the resistors $R_{120}$, $R_{140}$, $R_{160}$ are equal to each other.

An inverting input end of the first operational amplifier 540 is connected to the rotational angle detecting block 340 via the resistor $R_{110}$, a non-inverting input end of the second operational amplifier 560 is connected to the rotational angle detecting block 340 via the resistor $R_{150}$ and the non-inverting input end of the second operational amplifier 560 is connected to the D/A converter 330 via the resistor $R_{170}$.

Both of the comparators 570 and 580 serve to compare results of subtractions of the subtracting circuits 530 and 550 with predetermined threshold values $V_D$. The predetermined threshold value $V_D$ is a value which provides a stopping condition of the motor 350. The predetermined threshold value $V_D$ is determined with the required stopping accuracy and overrun characteristic of the motor 350.

The first subtracting circuit 530 outputs the subtraction result (i) which results in the subtraction of the output signal (d) of the D/A converter 330 from the output voltage (c) of the rotational angle detecting block 340 when the output voltage value (d) of the D/A converter 330 is greater than the output voltage (c) of the rotational angle detecting block 340.

The second subtracting circuit 550 outputs the subtraction result (j) which results in the subtraction of the output signal (d) of the D/A converter 330 from the output voltage value (c) of the rotational angle detecting block 340.

It is noted that although the format of the transmitted data when the first control unit 100 outputs the target value onto the signal transmission line 20 is the same as that in the first example (refer to FIG. 17), the target value itself is set on the data frame 490.

Next, an operation in the second example of the motor control system will be described below with reference to FIGS. 20A through 20G.

At a time of $t_{21}$, when the transmitted data (b) on the signal transmission line 20 is received by means of the reception circuit 31 of any one of the actuators 300-1, the transmitted data (b) are fetched into the decoder 320 and are converted into the corresponding analog value by means of the D/A converter 330.

In this case, since the value of the data frame 490 of the transmitted data (b) of the first control unit 100 is [4] of the target value, the output voltage of (d) (refer to FIG. 20D) of the D/A converter 330 indicates 4 volts.

The output voltage values (d) and (c) of the D/A converter 330 and the rotational angle detecting block 340 are supplied to the two subtracting circuits 530 and 540, respectively. The first subtracting circuit 530 of the motor control block 360A outputs {(D/A converter output 4 (V))−( rotational angle detecting block 0 (V)}=4 Volts. Since (D/A converter output)>(rotational angle detecting block), the value of the output voltage (j) of the second subtracting circuit 550 indicates 0 volts. If the value (i) of the first subtracting circuit 530 is equal to or greater than the threshold value $V_D$, output voltages of the comparators 570 and 580 indicate respectively at the high and low levels (Hi) and (Lo) and the motor 350 is driven to rotate in the predetermined direction.

Figure 20:
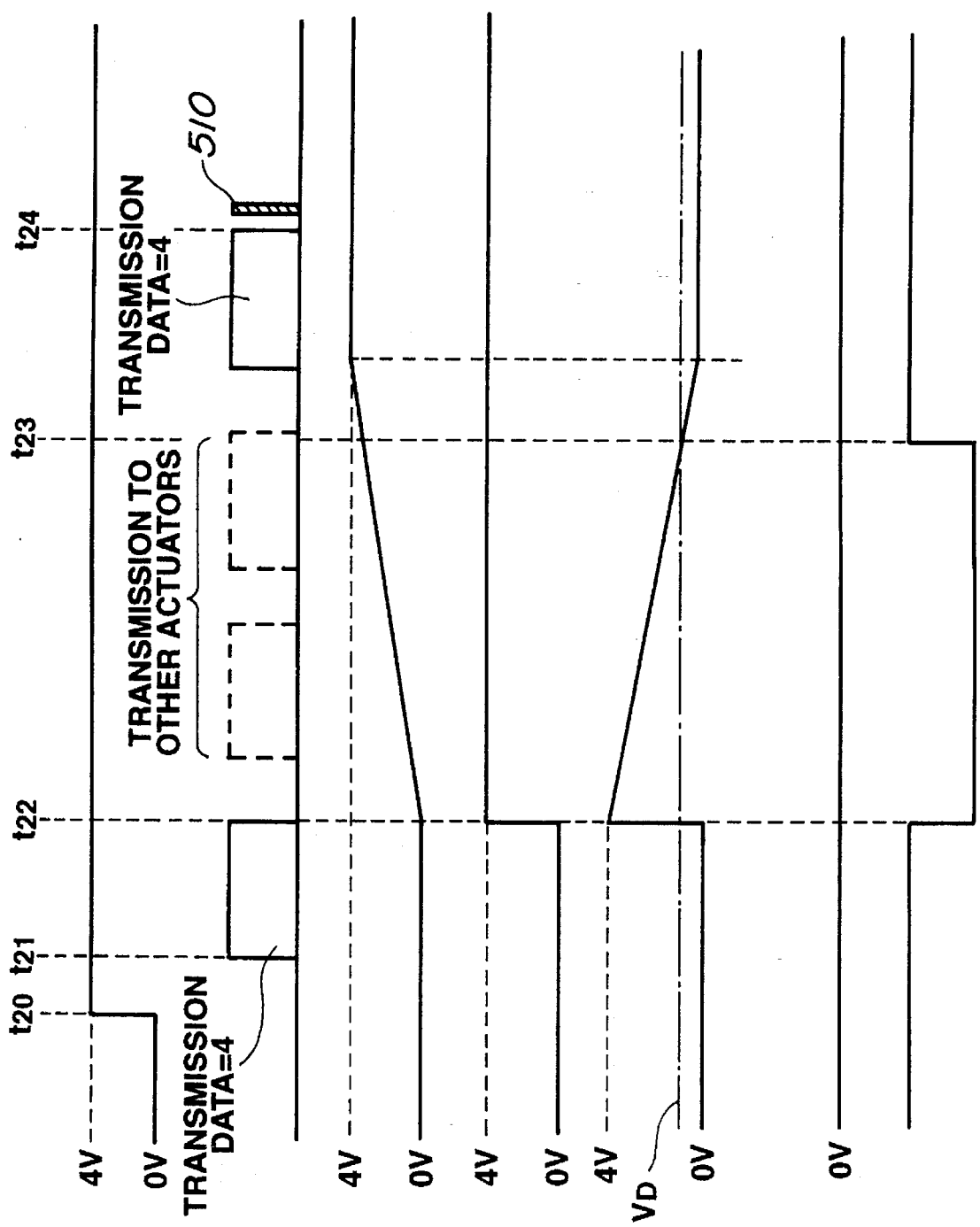
FIGS. 20A, 20B, 20C, 20E, 20F, and 20G are integrally a signal timing chart for explaining an operation of the first example shown in FIG. 14 but including the other example 360A in the motor control block shown in FIG. 19.

As a rotation speed of the motor 350 is increased, the value of the output voltage (c) is increased (refer to FIG. 20C). Then, at a time $t_{23}$, when ((D/A converter output)−(rotational angle detecting block output))<$V_D$, both of the comparators 570 and 580 indicate low levels (Lo) and the motor drive circuit 450, in response to the low levels (Lo), stops the motor 350.

When the output voltage levels of the comparators 570 and 580 indicate the low levels (Lo), the output voltage (h) of the control end detecting block 370 goes to the high level (Hi) indicating that the control for the motor 350 is ended (refer to FIG. 20G).

At a time $t_{24}$, when the reception of the subsequent transmitted data (b) is ended by means of the reception circuit: 310, the reception end signal is output from the reception circuit 310 to the transmission circuit 380. Since the output voltage (h) of the control end detecting block 370 indicates the high level (Hi), the control end pulse 510 having one bit is added to the trailing end of the transmitted data (b) and output onto the signal transmission line 20.

Next, in a case where the motor 850 is rotated in the opposite direction until the output value of the rotational angle detecting block 340 indicates 0 volts from the above-described state, the data processing block 110 of the first control unit 100 sees the target value to 0 on the data frame 490 in accordance with the transmitted data format shown in FIG. 17.

The transmitted data are output on the signal transmission line 20.

Then, the output voltage of the D/A converter 330 of any one of the actuators 300 which has received the transmitted data indicates 0 volts. At this time, the second subtracting circuit 550 of the motor control block 360A outputs ((rotational angle detecting block V)−(D/A converter output 0 V))=4 (V).

In addition, since (D/A converter output voltage)<(rotational angle detecting block output voltage), the output level of the first subtracting circuit 530 indicates 0 volts. If the output voltage value of the second subtracting circuit 550 is equal to or greater than the threshold value $V_D$, the output level of the one comparator 580 indicates the high level (Hi) and the output level of the other comparator 570 indicates the low level (Lo). The motor drive circuit 450 drives the motor 350 to rotate, in turn, in the opposite direction to the above-described predetermined direction. It is noted that the structure of the motor drive circuit 450 may be the same as that 11300 shown in FIG. 21 as will be described later.

As the rotation speed of the motor 350 is decreased, the output voltage of the rotational angle detecting block 340 is decreased. If ((rotational angle detecting block)−(D/A converter output))<$V_D$, both output voltages of the comparators 550 and 560 indicate low levels. Then, the motor drive circuit 450, in response to the low levels of both output voltages of the comparators 550 and 560, stops the motor 350.

It is noted that the transmission of the control end pulse in the first example is the same as that in the case of the first example.

(Third Example)

Figure 21:
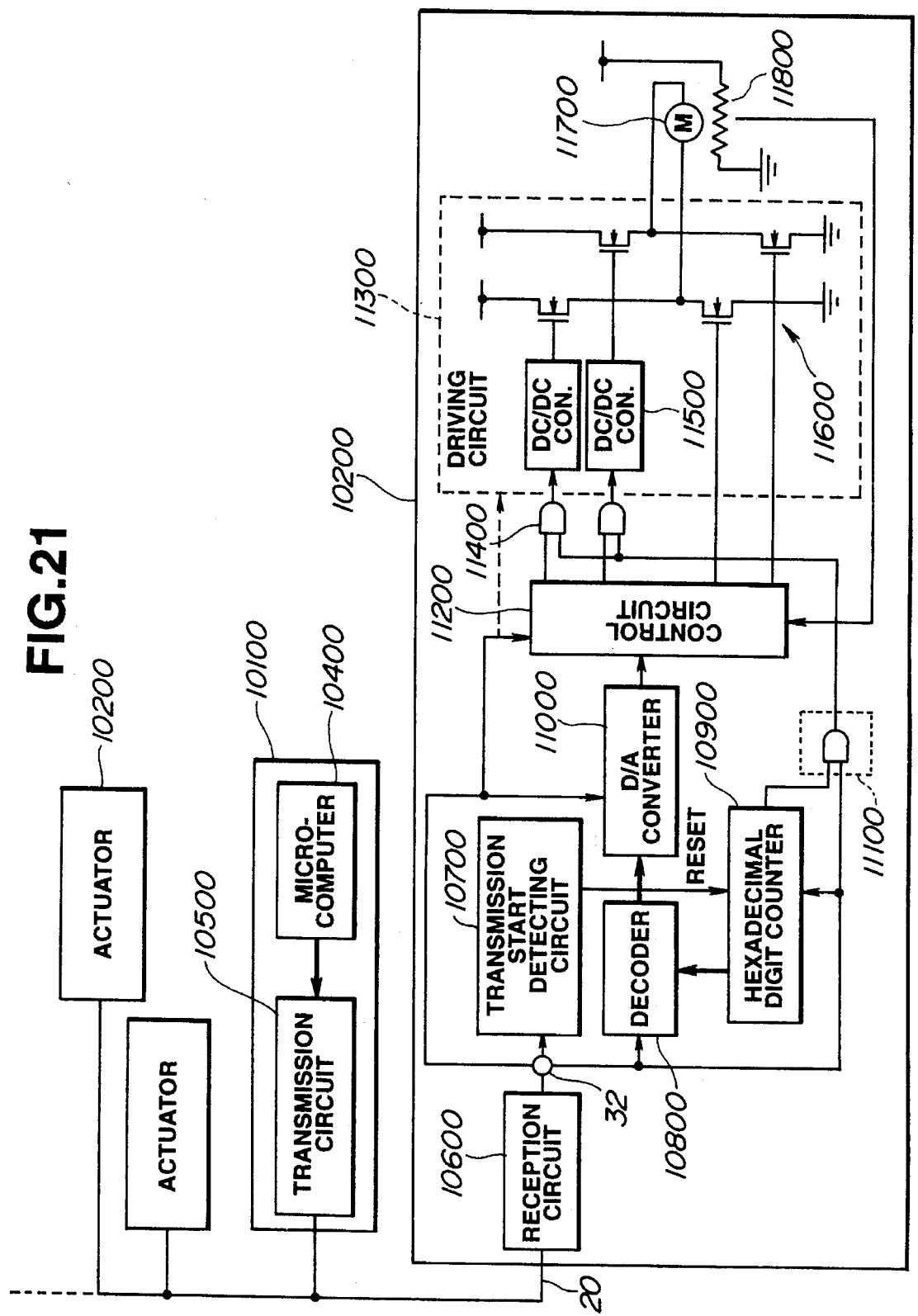
FIG. 21 is a circuit block diagram of a third example of the motor control system to which the multiplex serial data communication circuit network according to the present invention is applicable.

FIG. 21 shows a third example of the motor control system using the multiplex serial data communication circuit network in both first and second embodiments described above.

As shown in FIG. 21, the first control unit denoted by 10100 is connected to the plurality of actuators 10200, 10200, and 10200 via the signal transmission line 20.

The first control unit in the third example includes: a microcomputer 10400, for example, Z80 (manufactured name) which is so constructed and arranged as to generate the clock pulse signal described in the second embodiment and execute the data processing; and a transmission circuit 10500 which is so constructed and arranged as to output the clock pulse signal and the data signal from the microcomputer 10400 in the superposition form onto the signal transmission line 20.

Figure 22:
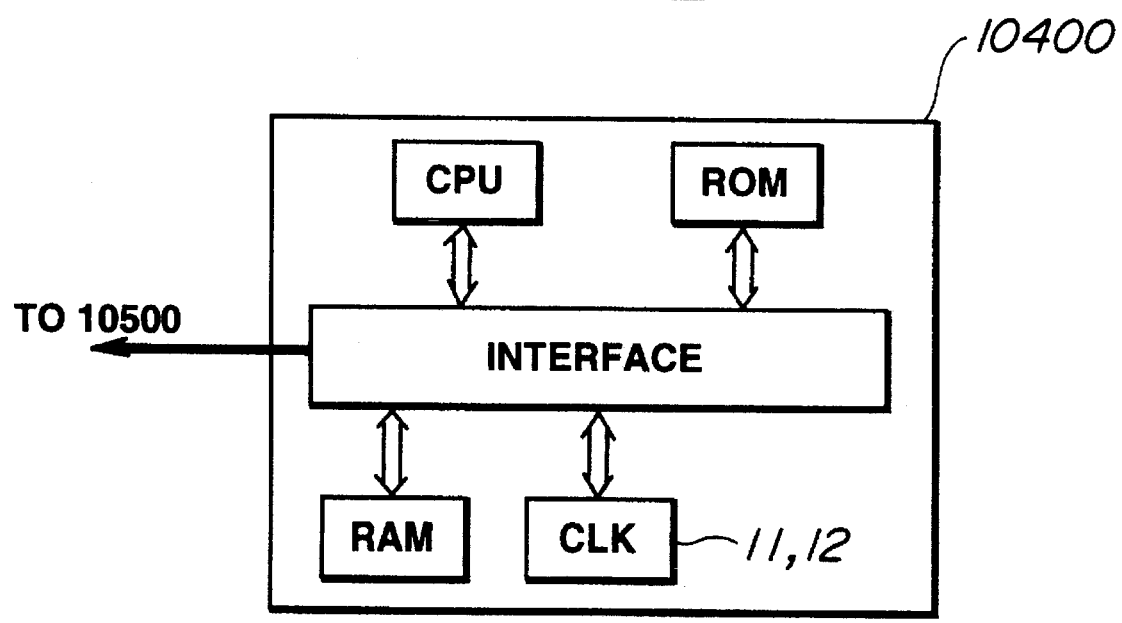
FIG. 22 is a circuit block diagram of a microcomputer 10400 shown in FIG. 21.

FIG. 22 shows an internal circuit block diagram of the microcomputer 10400. As generally known, the microcomputer 10400 includes a CPU (Central Processing Unit), a ROM (Read Only Memory), a RAM (Random Access Memory), a CLK (Clock pulse generator 11, 12), and interface circuit.

Referring back to FIG. 21, each actuator 10200 includes: the reception circuit 10600 which is so constructed and arranged as to receive the signal on the signal transmission line 20; a transmission start detecting circuit: 10700 connected to the reception circuit 10600; the decoder 10800; and an up counter with a reset end, for example, a hexadecimal digit counter 10900.

The hexadecimal digit counter 10900 counts up whenever the received signal rises or falls to generate a decoding timing of the received data.

The transmission start detecting circuit 10700 detects the start of the transmission of the first control unit 10100 and resets the hexadecimal digit counter 10900 via the reset end thereof. The decoder 10800 decodes the coded data achieved by the reception circuit 10600 on the basis of an output value of the hexadecimal digit counter 10900.

An output digital signal of the decoder 10800 is converted into the corresponding analog value and input into a control circuit 11200. An output signal of the control circuit 11200 is input to a motor driving circuit 11300 via AND circuits

11400. The motor driving circuit 11300 includes: two voltage boosters 11500, example, constituted by DC/DC converters 11500 which are constructed as to boost the output signals from the control circuit 11200 and drive the attached motor 11700 (generally the same as the motor 350 in the first example) to rotate via, so-called, H-bridge circuit 11600. The H-bridge circuit 11600 includes: four (first, second, third and fourth) cross coupled MOS power transistors interposed between the bias supply and ground. The motor 11700 is connected between a first junction between the first and third MOS power transistors and a second junction between the second and third MOS power transistors. In the same way as described in the first example, a variable resistor, called PBR (Potential Balance Resistor) 11800 is disposed on an output shaft of the motor 13700 to output a rotational angular displacement of the motor 11700 in the form of the output voltage to the control circuit 11200 of the corresponding one of the actuators 10200. The structure of the MOS power transistors with the DC motor is exemplified by the U.S. patent application Ser. No. 08/189,872 filed on Feb. 1, 1994 (which corresponds to a German Patent Application Publication No. DE 44 054 82 A1 published on Aug. 25, 1994).

The control circuit 11200 generally includes: an input port for receiving the output voltage signal from the variable resistor 31800; an input port for receiving the analog value of the D/A converter 11000, and arithmetic logic unit (ALU) to determine a normal direction rotation, reverse direction rotation, and stop of the motor 11700 according to the output voltage of the variable resistor (PBR) 11800 and decoded output of the decoder 10800 via the D/A converter 13000. The control circuit 11200 may be constituted by a, so-called, PWM (PulseWidth Modulator) circuit.

Each actuator 10200 further includes a pulse extracting circuit 11100 connected between the reception circuit 10600, the up counter 10900, and the AND circuits 400. It is noted that the pulse described above is different from the clock pulse signal.

The pulse extracting circuit 11100 includes an AND circuit and which is so constructed and arranged as to output the received pulse of the reception circuit 10600 to the AND circuits 11400 when the up counter 10900 indicates a predetermined count value.

FIGS. 23A, 23B, 23C, 23D, and 23E show communication codes to be transmitted from the first control unit 10100 onto the signal transmission line 20.

The high level (H) and low level (L) are defined by two kinds of pulses whose amplitudes are different.

As shown in FIGS. 23A through 23D, three consecutive pulse arrangements express two-bit parity data. For example, HHH means [00], HLH means [01], HHL means [10], and HLL means [11].

Figure 23A:
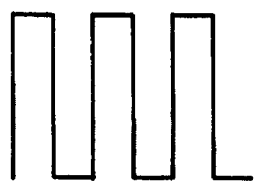
FIGS. 23A, 23B, 23C, 23D, and 23E are explanatory views of the data signal on the single signal transmission line 20 shown in FIG. 21.
Figure 23B:
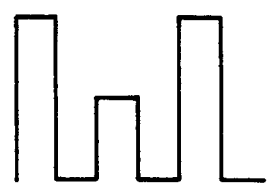
Figure 23C:
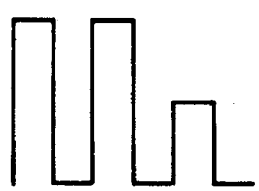
Figure 23D:
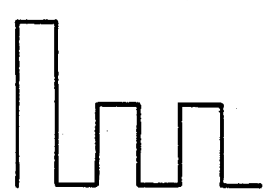
Figure 23E:

Furthermore, in order to clarify the start of the transmission, a pulse string having four consecutive pulses of [HLLL] serves as the transmission start code, as shown in FIG. 23E.

The microcomputer 10400 of the first control unit 101 encodes an address of any one of the actuators 10200 to be transmitted and a target position of the motor 11700 in accordance with the predetermined transmission format and outputs these encoded data onto the signal transmission line 103 via the transmission circuit 10500.

FIG. 24 shows an example of the transmission data format in the case of the third example of the motor control system.

As shown in FIG. 24, subsequently to the transmission start code 30100, the address 30200 allocated to any one of the actuators 10200, which is for the data to be transmitted, and having two bits; the data (data frame) 30300 representing the target position of the motor in the addressed actuator 10200 (receiving station of 30100) and having eight bits; and, finally, a one pulse 30400 defining on duration during a duty ratio control (described later) and which is added to the trailing portion of the data are sequentially and serially transmitted from the first control unit 10100.

It is noted that, in the third example, a signal is output to the pulse extracting circuit 11100 when a counted value of the up counter 10900 indicates $F_h$.

Next, an operation of the third example of the motor control system will be described with reference to FIGS. 25A through 25F.

Suppose herein that the transmission data of address=0 and the target position data=$5B_h$ (01011011b) are transmitted from the first control unit 10100.

FIG. 25A shows a signal potential transmitted on the signal transmission line 20.

FIG. 25B shows a count state in the up counter 10900 (hexadecimal digit counter).

FIG. 25C shows an output signal timing from the transmission start detecting circuit 10700.

FIG. 25D shows an output signal derived from the up counter 10900.

FIG. 25E shows an output signal derived from the pulse extracting circuit 11100.

FIG. 25F shows an output signal derived from the decoder 10800.

First, when the transmission of the formatted data is started from the first control unit 10100, the transmission start detecting circuit 10700 of the actuator 10200 detects the transmission start signal 30100 via the reception circuit 10600. At this time, the output signal as shown in FIG. 25C is issued to reset the up counter 10900. Then, the up counter 10900 counts up whenever the received pulse signal falls as shown in FIG. 25B (0, 1, 2, 3, ---, F). The decoder 10800 recognizes which position of the received data format the presently received pulse corresponds to and decodes the received signal on the basis of the counted value of the up counter 10900.

The decoder 10800 outputs the target position data in the form of the digital value after receipt of the data frame 30300 as shown in FIG. 25F when the address portion 30200 of the received signal is coincident with a self address (the address allocated to the actuator itself).

The control circuit 11200 determines the rotational direction of the motor 11700 so that the output voltage of the variable resistor 11800 indicating the present angular position of the motor 11700 becomes coincident with the target position converted into the analog value by means of the D/A converter 11000.

As shown in FIG. 25D, the up counter 10900 outputs the pulse signal to the pulse extracting circuit 11100 when its count value indicates a value corresponding to the final part of the transmitted data format, i.e., $F_h$, as shown in FIG. 25D. It is noted that a subscript h means hexadecimal.

At this time, the pulse extracting circuit 11100 outputs the pulse signal having the same width as the on duration defining pulse 30400 which is the final pulse of the transmission data format. Since the pulse extracting circuit 11100 is connected to the one input ends of the AND circuits 11400, the output signals from the control circuit 11200 are masked according to the output signal from the pulse extracting circuit 11100 so that the drive circuit 11600 receives the pulse signal having the controlled time width, thus a duty ratio control being carried out for the motor 11700.

As described above, since, in the third example of the motor control system, the pulse used for the duty ratio control for the motor is extracted from the transmission data format, it is not necessary to install a capacitor having a large capacity in the multiplex serial data communication circuit network in order to generate the pulse and the pulse duty ratio control with a small scale and with less cost can be achieved.

In the duty ratio control in the third example of the motor control system, the width of the on duration defining pulse 30400 equals to the on duration of the motor drive time duration and a communication interval of time in the first control unit 10100 (transmission period) is the control period of the motor duty ratio control.

Since the transmission code is generated by the microcomputer 10400 of the first control unit 10100, the times of the communication interval and/or on duration defining pulsewidth can arbitrarily be set by means of a communication control software programmed in the microcomputer 10400. For example, both communication interval and on duration defining pulse can be controlled.

In this way, since the duty ratio can be modified from the software programmed in the microcomputer 10400, it is not necessary to modify the circuitry in the actuators and first control unit when a change in specifications of the motor 11700 is carried out or the motor is applied to another system. A custom IC can directly be utilized.

(Fourth Example)

A fourth example of the motor control system will, herein, be described below. It is noted that the circuit structure of the fourth example is generally the same as FIG. 21 in the case of the third example.

FIGS. 26A, 26B, and 26C show integrally a signal timing chart for explaining the operation in the fourth example of the motor control system.

In the fourth example, the output signal from the up counter 10900 to the pulse extracting circuit 11100 is carried out irrespective of the contents of address data portion of the transmission data format.

FIG. 26A shows the signal string to be transmitted on the signal transmission line 20.

FIG. 26B shows the output signal derived from the pulse extracting circuit 11100 in the fourth example.

FIG. 26C shows an output code form from the decoder 10800 in the fourth example.

The transmissions of the data from the first control unit 10100 to the actuators having the differently allocated addresses are sequentially carried out as shown in FIG. 26A.

For example, while the first control unit 10100 continues the transmissions of the data to the actuators than than the addressed actuator 10200 after the target position data has been received at the addressed actuator 10200, the addressed actuator, i.e., the address=0, extracts the pulses required to perform the duty ratio control from the transmitted data format allocated to the other actuators as shown in FIG. 26B.

It is noted that the target position data of the motor 11700 is maintained as it is thereat and the next transmitted signal allocated to the own addressed actuator 10200 is decoded and updated.

Consequently, the duty ratio control having a short pulse period can be achieved without wait for the next addressed transmitted data to the corresponding one of the actuators, in the fourth example.

Since, in this case, the communication interval shown in FIG. 26A means the period of the duty ratio control, these interval and period can arbitrarily be controlled by means of the communication control software. As described in the case of the third example, both communication interval and on duration defining pulsewidth can be controlled.

As described hereinabove, since in the multiplex serial data communication circuit network and method according to the present invention, the first transmission control apparatus having the single oscillation source always outputs the clock information onto the signal transmission line. On the other hand, each of the second transmission control apparatuses extracts the clock pulse signal from the signal received from the signal transmission line, so as to be operated upon the extracted clock pulse signal (such as processing operation of the received data signal and transmission of the data toward the signal transmission line). Furthermore, if the first transmission control apparatus is provided with only the oscillation source and frequency divider, the clock pulse signal always output on the transmission line is extracted at each of the transmission control apparatuses. On the basis of the extracted clock signal, any one and any other of the second transmission control apparatuses can mutually carry out the data transmission/reception between each other.

In addition, since, in the motor control system and method using the multiplex serial data communication circuit network and method, a circuit scale required to carry out the self-diagnose becomes reduced and the transmission frame becomes shorter, with the self-diagnose according to the transmitted data carried out, it becomes possible to increase the number of communications per unit time and the response characteristic becomes preferable.

Furthermore, since in the motor control system and method using the multiplex serial data communication network and method the pulse signal used to perform the duty ratio control for the motor is extracted from the communication (transmitted data) signal, a small-scale and low-cost duty ratio control can be achieved.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A multiplex serial data communication circuit network comprising:

a) a clock pulse oscillation circuit for generating a clock pulse signal;

b) a single signal transmission line on which a signal is transmitted bidirectionally in a multiplex time division mode;

c) a clock pulse signal output circuit for transmitting the clock pulse signal generated by the clock pulse oscillation circuit on said single signal transmission line;

d) a transmission data generation/output circuit for superposing a transmission data on the clock pulse signal output from said clock pulse signal output circuit;

e) a clock pulse signal extraction circuit for receiving signals present on the transmission line and for extracting the clock pules signal from the received signals; and f) means for separating and extracting a signal required to operate therein from among the received signals and for executing a signal processing in synchronization with the extracted clock pules signal.

2. A multiplex serial data communication circuit network comprising:

a) a clock pulse oscillation circuit;
b) a single signal transmission line;
c) a clock pulse signal output circuit which is constructed and arranged as to transmit a clock pulse signal generated by the clock pulse oscillation circuit on said single signal transmission line;
d) a transmission data generation/output circuit which is so constructed and arranged as to superpose a transmission data on the clock pulse signal output from said clock pulse signal output circuit;
e) a clock pulse signal extraction circuit which is so constructed and arranged as to receive signals present on the transmission line and as to extract the clock pulse signal from the received signals; and
f) means for separating and extracting a signal required to operate therein from among the received signals and for executing a signal processing in synchronization with the extracted clock pulse signal, wherein at least said clock pulse oscillation circuit, the clock pulse signal output circuit and transmission data generation/output circuit constitute a master station, which further comprises g) a data signal output circuit which is so constructed and arranged as to superimpose another transmission data on the clock pulse signal and output the superposed transmission data on the single transmission line, and wherein said clock pulse signal extraction circuit, said extracting and separating means, and data signal output circuit constitute a single slave station, and said slave station is constituted by a plurality of same slave stations in the multiplex serial data communication circuit network.

3. A multiplex serial data communication circuit network as claimed in claim 2, wherein said clock signal output circuit alternatively switches a potential on the signal transmission line between a relatively high potential and a relatively low potential in synchronization with the clock pulse signal so as to output the clock signal on the signal transmission line and wherein said data signal output circuit switches the potential on the signal transmission line to an intermediate potential between the relatively high and low potentials in accordance with the data to be output so as to superpose the transmission data on the clock pulse signal when the signal transmission line is at the relatively high potential.

4. A multiplex serial data communication circuit network as claimed in claim 3, wherein said clock signal output circuit comprises: a constant voltage supply; a pull-up resistor; and a first transistor, said signal transmission line being connected to the constant voltage supply via said pull-up resistor and said first transistor being interposed between said signal transmission line and the ground and being turned on and off in synchronization with said clock pulse signal and wherein said transmission data generation/output circuit comprises a series-connected circuit interposed between said signal transmission line and the ground having a pull-down resistor and a second transistor which is turned on and off in accordance with the transmission data, said series-connected circuit being in parallel to said first transistor.

5. A multiplex serial data communication circuit network as claimed in claim 4, wherein said clock signal extraction circuit comprises a comparator which is so constructed and arranged as to compare the potential of the received signal with a reference potential, the reference potential being previously set so as to provide a potential between the intermediate potential and the relatively low potential.

6. A multiplex serial data communication circuit network as claimed in claim 2, wherein said each slave station or said master station further includes data transmission start detecting means for detecting a data transmission start when a predetermined signal string is received and outputting a detection signal indicating the detection of the data transmission start so that said each slave station or master station retrieves signals incoming after said predetermined signal string is received as the transmission data on the basis of the detection signal of said data transmission start detecting means.

7. A multiplex serial data communication circuit network as claimed in claim 2, wherein said master station is a first control apparatus, any one of said slave stations is a second control apparatus, and said transmission data and other transmission data are constituted by a control data including a data related to a target value of a motor rotational angle and being based on a predetermined transmission format, said control data being transmitted from the first control apparatus to the second control apparatus via said signal transmission line so as to control the rotational angle of said motor.

8. A multiplex serial data communication circuit network as claimed in claim 7, wherein said second control apparatus further comprises:

h) receiving means for receiving said control data output on said signal transmission line;
i) a decoder which is so constructed and arranged as to decode said control data received by said receiving means;
j) a digital-to-analog converter which is so constructed and arranged as to convert the data included in said control data and related to the target value of the motor rotational angle into a corresponding analog value from a result of decode of said decoder;
k) rotational angle detecting means for detecting the rotational angle of the motor and outputting a present value of the rotational angle as its analog value;
l) motor controlling means for receiving an output value of the digital-to-analog converter and an output value of said rotational angle detecting means and for controlling the motor rotational angle so that the present value of the motor rotational angle becomes coincident with the target value;
m) control end detecting means for detecting a control end of the motor rotational angle when the present value of the motor rotational angle is made approximately equal to the target value; and
n) transmitting means for adding a control end data to the control data so as to output the control end data added control data onto the signal transmission line when said receiving means receives the subsequent control data output from said first control apparatus after said control end detecting means has detected the control end.

9. A multiplex serial data communication circuit network as claimed in claim 8, wherein said predetermined transmission format is such a format that the control end data is added at a trailing end of the control data.

10. A multiplex serial data communication circuit network as claimed in claim 9, wherein said control end data comprises one bit.

11. A multiplex serial data communication circuit network as claimed in claim 10, wherein said data related to the target value of the motor rotational angle is a data indicating a deviation between a predetermined value and said target value and wherein said motor controlling means comprises:

o) average value calculating means for calculating an average value between the output values of said rotational angle detecting means and of said digital-to-analog converter;

p) a window comparator which is so constructed and arranged as to compare the calculated average value with upper limit and lower limit values defining a predetermined range so as to determine a level of the calculated average value of said average value calculating means; and q) driving means for operatively determining a rotation direction of said motor and driving said motor so that the calculated average value falls within said predetermined range when said window comparator determines that the calculated average value is outside of the predetermined range and for stopping said motor when said window comparator determines that the calculated average value falls within the predetermined range.

12. A multiplex serial data communication circuit network as claimed in claim 11, wherein said control end detecting means comprises a gate circuit which is so constructed and arranged as to detect said control end when said window comparator determines that the calculated average value falls within said predetermined range.

13. A multiplex serial data communication circuit network as claimed in claim 12, wherein said rotational angle detecting means comprises a variable resistor which is so constructed and arranged as to convert the detected rotational angle into a voltage value in accordance with the present value of the motor rotational angle and output said voltage value.

14. A multiplex serial data communication circuit network as claimed in claim 10, wherein the data related to the target value of the motor rotational angle is a data of the target value, and wherein said motor controlling means comprises:

o) first subtracting means for outputting a first level difference between the present value of the motor rotational angle and target value when the present value of the motor rotational angle is larger than the target value;

p) second subtracting means for outputting a second level difference between the present value of the motor rotational angle and target value when the present value of the motor rotational angle is smaller than the target value;

q) a first comparator which is so constructed and arranged as to compare the first level difference with a predetermined threshold value so as to determine the level of the first level difference;

r) a second comparator which is so constructed and arranged as to compare the second level difference with the predetermined threshold value so as to determine the level of the second level difference; and s) driving means for operatively determining a rotation direction of said motor and driving said motor so that both of said first and second level differences are smaller than the predetermined threshold value when both of said first and second comparator determine that either of said first or second level difference is smaller than the predetermined threshold value.

15. A multiplex serial data communication circuit network as claimed in claim 14, wherein said control end detecting means comprises a gate circuit which is so constructed and arranged as to detect the control end when both of said first and second comparators determine that both of said first and second level differences are smaller than the predetermined threshold value.

16. A multiplex serial data communication circuit network as claimed in claim 5, wherein said rotational angle detecting means comprises a variable resistor which is so constructed and arranged as to convert the detected rotational angle into a voltage value in accordance with the present value of the motor rotational angle and output said voltage value.

17. A multiplex serial data communication circuit network as claimed in claim 1, wherein at least said transmission data generation/output circuit constitutes a first communication control apparatus and at least said clock pulse signal extraction circuit and signal processing means constitute a second communication control apparatus and said transmission data are control data including a target position of a motor, said motor being included in said second communication control apparatus, and wherein said first communication control apparatus outputs the control data onto the signal transmission line in a form of a predetermined pulse signal on a basis of a predetermined data transmission format and said signal processing means of said second communication control apparatus comprises:

g) receiving means for receiving said predetermined pulse signal, and said clock pulse signal on said signal transmission line;

h) a decoder which is so constructed and arranged as to decode the received signals derived from said receiving means so as to derive the target position of the motor;

i) pulse signal extracting means for extracting the predetermined pulse signal from the received signals;

j) position detecting means for detecting and outputting a present position of the motor; and k) motor controlling means for controlling the motor so that the detected present position becomes coincident with the target position, said motor controlling means controlling a duty ratio of a drive signal applied to said motor according to the extracted predetermined pulse signal by said pulse signal extracting means.

18. A multiplex serial data communication circuit network as claimed in claim 17, wherein said first communication control apparatus varies a width of said predetermined pulse signal in the predetermined data transmission format to be output onto the signal transmission line so that the motor controlling means variably controls the duty ratio of said motor drive signal.

19. A multiplex serial data communication circuit network as claimed in claim 18, wherein said second communication control apparatus further comprises a sequence counter which is so constructed and arranged as to count the predetermined pulse signal of the received signals and generate a decode timing of the decoder according to a result of the counting of the predetermined pulse signal and wherein said pulse signal extracting means extracts the predetermined pulse signal when said sequence counter indicates a predetermined count value.

20. A multiplex serial data communication circuit network as claimed in claim 19, wherein said pulse signal extracting means extracts the predetermined pulse signal from the received signals irrespective of an address allocated to each of said second communication control apparatuses and to which any one of the second communication control apparatuses to which the control data from said first communication control apparatus to be transmitted via the signal transmission line is allocated.

21. A multiplex serial data communication circuit network as claimed in claim 20, wherein said first and second communication control apparatuses are mounted together with the signal transmission line within an automotive vehicle.

22. A multiplex serial data communication method network comprising the steps of:

a) generating a clock pulse signal in a clock pulse oscillation circuit;

b) providing a single signal transmission line on which a signal is transmitted bidirectionally in a multiplex time division mode;

c) transmitting the clock pulse signal generated by the clock pulse oscillation circuit on said single signal transmission line;

d) superposing a transmission data on the clock pulse signal transmitted on the transmission line;

e) receiving signals present on the transmission line and extracting the clock pulse signal from the received signals; and f) separating and extracting a signal required to operate therein from among the received signals and executing a signal processing in synchronization with the extracted clock pulse signal.

23. A multiplex communication network for clock-controlled transmission of serial data between transmission control stations through a single signal transmission line connecting the transmission control stations, said network comprising:

a) a clock pulse oscillation circuit for generating a clock pulse signal; and b) a clock pulse signal output circuit for transmitting the clock pulse signal generated by the clock pulse oscillation circuit to the signal transmission line, said network, said transmission control stations, and said signal transmission line operating for transmission between said stations in both directions; and wherein each said transmission control station includes:

c) a transmitting and receiving circuit for superposing a data signal of said each station on the clock pulse signal, for transmitting the superposed data signal and clock pulse signal to said signal transmission line, said transmitted data signal having a same frequency as the clock pulse signal, and for receiving a superposed data signal and clock pulse signal from said signal transmission line; and d) means for separating a signal related to said each station from among the signals received from said transmitting and receiving circuit and for decoding the separated signal to perform signal processing in synchronization with said clock pulse signal.

24. A multiplex data communication circuit network as claimed in claim 23, wherein at least said clock pulse oscillation circuit, the clock pulse signal output circuit and the transmitting and receiving circuit constitute a master station, which further comprises g) a data signal output circuit which is so constructed and arranged as to superimpose another data signal on the clock pulse signal and to output the superposed another data signal on the single transmission line, and further including a slave station, comprising said separating means and said data signal output circuit, a plurality of same slave stations being included in the multiplex serial data communication circuit network.

25. A multiplex data communication circuit network as claimed in claim 24, wherein said clock pules signal output circuit alternately switches a potential on the signal transmission line between a relatively high potential and a relatively low potential in synchronization with the clock pulse signal so as to output the clock pulse signal on the signal transmission line and wherein said data signal output circuit switches the potential on the signal transmission line to an intermediate potential between the relatively high and low potentials in accordance with the another data signal to be output so as to superpose the another transmission data signal on the clock pulse signal when the signal transmission line is at the relatively high potential.

26. A multiplex serial data communication circuit network as claimed in claim 25, wherein said clock pulse signal output circuit comprises: a constant voltage supply; a pull-up resistor; and a first transistor, said signal transmission line being connected to the constant voltage supply via said pull-up resistor and said first transistor being interposed between said signal transmission line and the ground and being turned on and off in synchronization with said clock pulse signal and wherein said transmitting and receiving circuit comprises a series-connected circuit interposed between said signal transmission line and the ground having a pull-down resistor and a second transistor which is turned on and off in accordance with the data signal, said series-connected circuit being in parallel to said first transistor.

27. A multiplex serial data communication circuit network as claimed in claim 26, wherein said separating means comprises a comparator which is so constructed and arranged as to compare the potential of a received signal with a reference potential, the reference potential being previously set so as to provide a potential between the intermediate potential and the relatively low potential.

28. A multiplex serial data communication circuit network as claimed in claim 24, wherein said each slave station or said master station further includes data transmission start detecting means for detecting a data transmission start when a predetermined signal string is received and outputting a detection signal indicating the detection of the data transmission start so that said each slave station or master station retrieves signals incoming after said predetermined signal string is received as the data signal on the basis of the detection signal of said data transmission start detecting means.

29. A multiplex serial data communication circuit network comprising:

a) a clock pulse oscillation circuit (11) for generating a clock pulse signal;

b) a single signal transmission line (20);

c) a clock pulse signal output circuit for transmitting the clock pulse signal generated by the clock pulse oscillation circuit on said single signal transmission line;

d) a first signal transmission control station including:

i) a transmission data generating and outputting circuit for superposing and outputting a transmission data on the clock pulse signal outputted from said clock pulse signal output circuit, the transmission data having the same frequency as the clock pulse signal;

ii) a clock pulse signal extraction circuit for receiving signals present on the single signal transmission line and for extracting the clock pulse signal from the received signals; and iii) means for separating and extracting a signal required to operate therein from among the received signals and for executing a signal processing in synchronization with the extracted clock pulse signal; and e) at least a second signal transmission control station including:

i) a clock pulse signal extraction circuit substantially identical with said clock pulse signal extraction circuit of said first signal transmission control station;

ii) a transmission data generating and outputting circuit substantially identical with said transmission data generating and outputting circuit of said first signal transmission control station; and iii) means for separating and extracting substantially identical with said means for separating and extracting of said first signal transmission control station.

\* \* \* \* \*